United States Patent
Sakata

(10) Patent No.: US 7,270,427 B2
(45) Date of Patent: Sep. 18, 2007

(54) DISPLAY DEVICE, LIGHTING DEVICE AND PROJECTOR

(75) Inventor: Hidefumi Sakata, Tatsuno-cho (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/605,466

(22) Filed: Nov. 29, 2006

(65) Prior Publication Data

US 2007/0070304 A1   Mar. 29, 2007

Related U.S. Application Data

(62) Division of application No. 10/809,468, filed on Mar. 26, 2004, now Pat. No. 7,159,987.

(30) Foreign Application Priority Data

| Apr. 21, 2003 | (JP) | ............................. 2003-115653 |
| Apr. 21, 2003 | (JP) | ............................. 2003-115654 |
| Nov. 28, 2003 | (JP) | ............................. 2003-399347 |

(51) Int. Cl.
*G03B 21/28* (2006.01)
*F21V 33/00* (2006.01)
*G02F 1/13357* (2006.01)

(52) U.S. Cl. .......................... 353/94; 353/84; 362/231; 362/234; 349/61

(58) Field of Classification Search ................ 353/30, 353/33, 34, 97, 85, 84, 81, 20, 31, 94, 98, 353/99; 348/752, 762, 800–803; 362/19, 362/230, 231, 234, 253, 296–307; 349/9, 349/61, 62, 69

See application file for complete search history.

(56) References Cited

U.S. PATENT DOCUMENTS

| 4,127,322 | A | 11/1978 | Jacobson et al. |
| 5,042,921 | A | 8/1991 | Sato et al. |
| 5,452,128 | A | 9/1995 | Kimura |
| 5,546,200 | A | 8/1996 | Nicolas et al. |
| 5,648,860 | A | 7/1997 | Ooi et al. |
| 5,844,638 | A | 12/1998 | Ooi et al. |
| 6,327,093 | B1 | 12/2001 | Nakanishi et al. |
| 6,762,785 | B2 | 7/2004 | Roddy et al. |
| 6,779,892 | B2 | 8/2004 | Agostinelli et al. |
| 6,802,613 | B2 * | 10/2004 | Agostinelli et al. ........... 353/31 |
| 6,834,963 | B2 | 12/2004 | Kim et al. |
| 6,918,682 | B2 | 7/2005 | Kim et al. |
| 6,942,345 | B2 | 9/2005 | Okuyama et al. |
| 2003/0214633 | A1 | 11/2003 | Roddy et al. |
| 2006/0256562 | A1 * | 11/2006 | Long et al. ................. 362/328 |

FOREIGN PATENT DOCUMENTS

JP   A 04-011492   1/1992

(Continued)

OTHER PUBLICATIONS

Hiyama et al.; "LN03: Four-Primary Color 15-in. XGA TFT-LCD with wide Color Gamat," EURODISPLAY, pp. 837-830.

*Primary Examiner*—Andrew T. Sever
(74) *Attorney, Agent, or Firm*—Oliff & Berridge, PLC

(57) ABSTRACT

The object is to provide a display device that is capable of displaying an image with high luminance and a wide color reproduction range under simple control. The display device includes a light source device that emits first to fourth illumination lights, a spatial light modulator that modulates the illumination lights, and a controller. The controller allows the first and the second illumination lights to time-sequentially enter an identical illumination area of the spatial light modulator, and allows the third and the fourth illumination lights to individually enter the spatial light modulator so as to avoid them from being superimposed on the first and the second illumination lights.

4 Claims, 26 Drawing Sheets

FOREIGN PATENT DOCUMENTS

| | | |
|---|---|---|
| JP | A 6-51125 | 2/1994 |
| JP | A 7-5419 | 1/1995 |
| JP | A 7-244282 | 9/1995 |
| JP | A 7-294867 | 11/1995 |
| JP | A 11-95163 | 4/1999 |
| JP | A 11-174373 | 7/1999 |
| JP | A 2000-19481 | 1/2000 |
| JP | A 2000-275733 | 10/2000 |
| JP | A 2001-042431 | 2/2001 |
| JP | A 2001-066551 | 3/2001 |
| JP | A 2001-075174 | 3/2001 |
| JP | A 2001-174916 | 6/2001 |
| JP | A 2001-264697 | 9/2001 |
| JP | A 2001-305656 | 11/2001 |
| JP | A 2002-182151 | 6/2002 |
| JP | A 2002-182157 | 6/2002 |
| JP | A 2002-244104 | 8/2002 |
| JP | A 2002-244626 | 8/2002 |
| JP | A 2002-318564 | 10/2002 |
| JP | A 2003-44016 | 2/2003 |
| JP | A 2003-075911 | 3/2003 |
| JP | A 2003-161916 | 6/2003 |
| JP | A 2003-177353 | 6/2003 |
| JP | A 2003-177716 | 6/2003 |
| JP | A 2003-233352 | 8/2003 |
| JP | A 2003-248463 | 9/2003 |
| JP | A 2003-280095 | 10/2003 |
| JP | A 2003-287733 | 10/2003 |
| JP | A 2004-70065 | 3/2004 |
| JP | A 2004-245888 | 9/2004 |
| JP | A 2005-049362 | 2/2005 |
| JP | A 2005-233982 | 9/2005 |
| WO | WO97/01780 | 1/1997 |
| WO | WO 03/013193 A1 | 2/2003 |

* cited by examiner

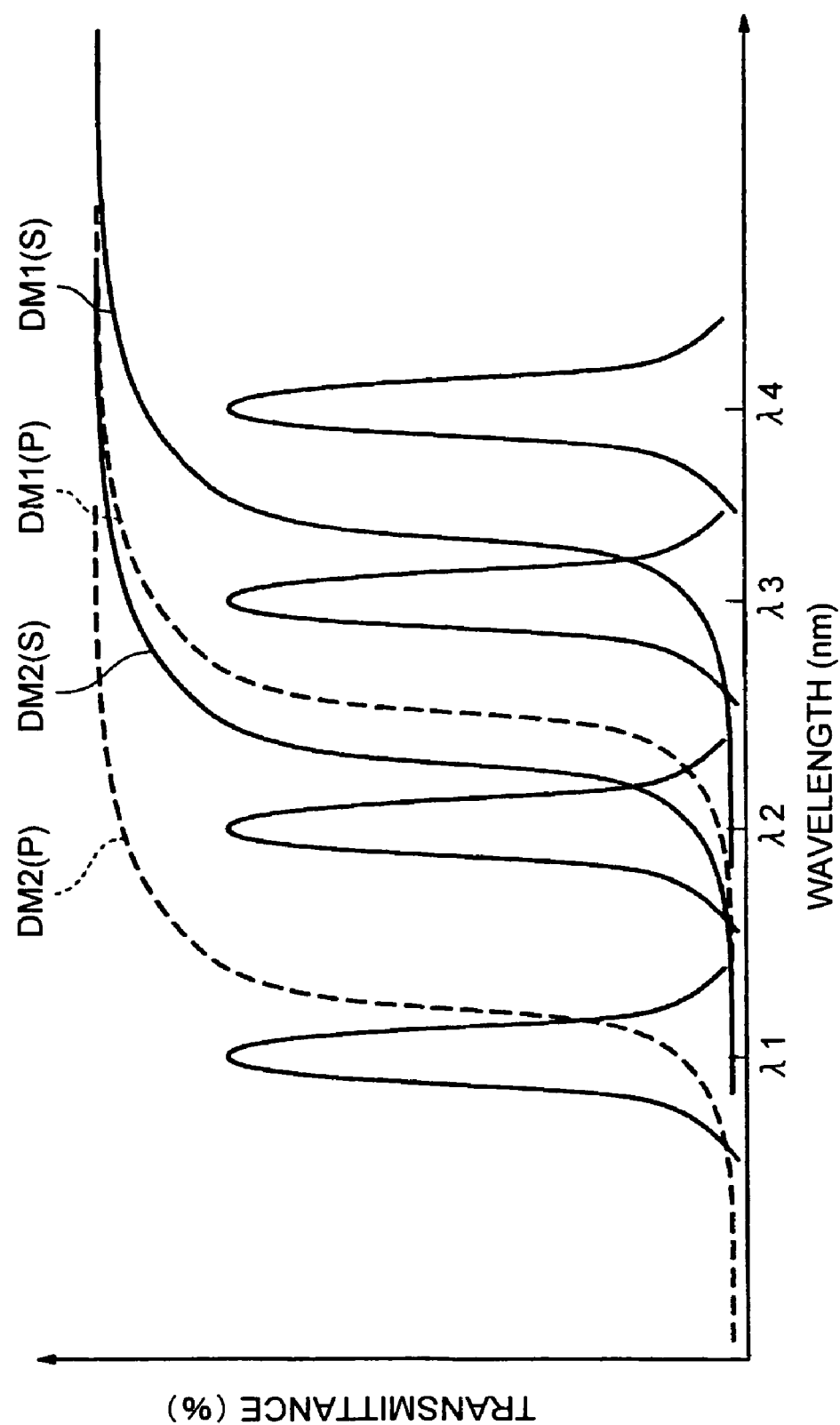

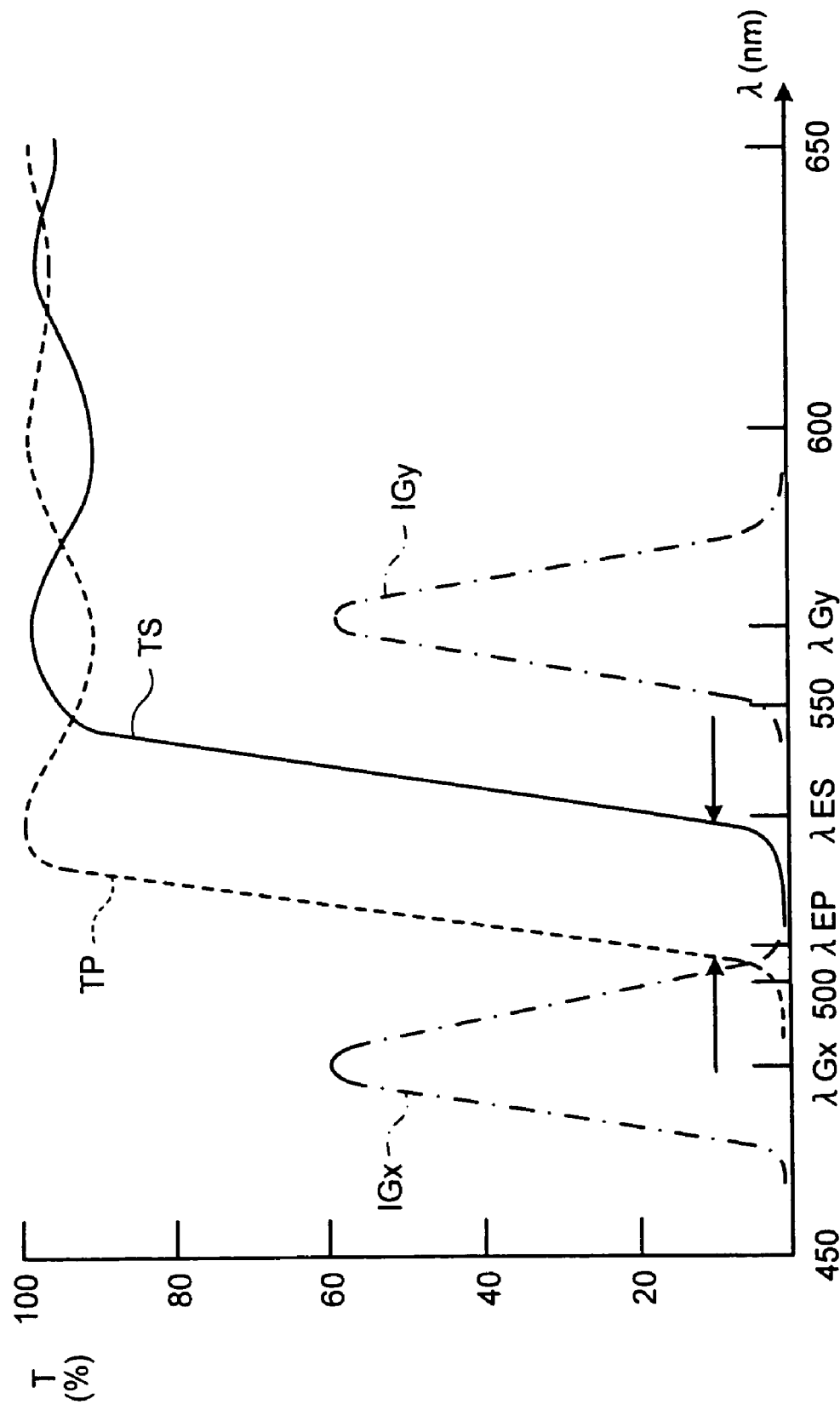

DISPLAY DEVICE, LIGHTING DEVICE AND PROJECTOR

This is a Division of application Ser. No. 10/809,468 filed Mar. 26, 2004, now U.S. Pat. No. 7,159,987. The disclosure of the prior application is hereby incorporated by reference herein in its entirety.

BACKGROUND OF THE INVENTION

1) Field of the Invention

The present invention relates to a display device, a lighting device, and a projector, and more particularly, to a display device and a lighting device used in a projector.

2) Description of the Related Art

As flat panel displays (FPD), there have been known displays with a two-dimensional array of light emitting diodes (LED) that are solid-state light emitting elements used as a back light (see I. Hiyama et al., LN-3: "Four-Primary Color 15-in. XGA TFT-LCD with Wide Color Gamut", EURODISPLAY2002, PP827-830). In such an FPD, one frame is divided into a pair of subframes, and displays of colored lights G1 light and G2 light that are approximate to a green light (hereinafter, "G light") are allocated to the subframes, respectively, and displays of a red light (hereinafter, "R light") and a blue light (hereinafter, "B light") are also allocated thereto, respectively. Therefore, a first subframe displays images of the R light and the G1 light, and a second subframe displays images of the G2 light and the B light. Consequently, an image can be expressed with four colored lights, which allows a color reproduction range to be widened.

The LED has advantages such that it has generally longer life as compared with that of an extra-high pressure mercury lamp or the like and light conversion efficiency is high. Therefore, the LED is increasingly used as a light source of a lighting device. The LED as a single unit has an amount of light emission smaller as compared with that of the extra-high pressure mercury lamp or the like. A light source of a projector requires a comparatively larger amount of light. Therefore, some structures to increase the amount of light have been proposed to use the LED as the light source of the projector. For example, Japanese Patent Application Laid Open No. 2001-42431 discloses a structure of illuminating a liquid-crystal-type light valve as an example of a spatial light modulator of the projector using a light source device that includes many LEDs having different light emission wavelengths. In the light source device, luminous fluxes emitted from a pair of LEDs having slightly different light emission wavelengths are combined in a dichroic mirror, that is, colors are combined to increase the intensity of a colored light having a particular wavelength range, and the amount of light is thereby increased.

However, in the FPD, two-color illumination and display are performed simultaneously, and therefore, a color filter is essential, which causes the structure of the LCDs, i.e., an image display portion to be complicated and the loss of light amount at the filter to occur. Furthermore, in the FPD, one frame is divided into a pair of subframes, and it is therefore required to drive the LCD or the like at double speed, which causes generation of control signals corresponding to respective colors to become extremely complicated. Moreover, lights are emitted from only two LEDs out of four LEDs corresponding to four colors. As a result, a long dead time occurs in the LEDs, that is, the LEDs are not made effective use of. It can be considered that the four LEDs corresponding to the four colors are simultaneously lit by using an appropriate filter. However, a difference in intensity between the G1 light and the G2 light in the divided portions may become extremely large depending on display images. Therefore, when lighting is switched between the G1 light and the G2 light, the intensity of a pixel for adjacent R light or G light may unstably fluctuate due to influence of the switching between the subframes.

Generally, in the dichroic mirror for color combination, a wavelength, i.e., a cutoff frequency in the vicinity of a wavelength in which transmittance characteristic or reflectance characteristic is largely changed, is different from another cutoff frequency between a p-polarized light and an s-polarized light. Therefore, it is required to set a light emission central wavelength (hereinafter, "peak wavelength") of a pair of LEDs in both sides of the outside of a wavelength range between a pair of cutoff frequencies corresponding to both the polarized lights. Such a difference between the peak wavelengths sometimes reaches about 50 nanometers (nm). Therefore, in the light source device disclosed in the publication, peak wavelengths of a pair of luminous fluxes emitted from the pair of LEDs cannot be made closer to a predetermined value or more caused by optical characteristics of the dichroic mirror. As a result, the difference between the peak wavelengths of the pair of luminous fluxes becomes larger, which results in occurrence of a problem such that color purity of a particular color obtained after wave combination is reduced. If a pair of luminous fluxes having close peak wavelengths is made to enter the dichroic mirror, a part of the fluxes is reflected by the dichroic mirror although all the fluxes are desired to pass through it, which results in the loss of light amount, or a part of the fluxes passes through the dichroic mirror although all the fluxes are desired to be reflected thereby, which results in the loss of light amount. Therefore, it is difficult to obtain high-intensity illumination light with high color purity based on the conventional structure.

It is further considered that a plurality of LEDs is arranged in an array as a structure for increasing a light amount from the light source using LED. This arrangement allows the light amount to be increased in proportion to the number of LEDs. In an optical system including the light source and the spatial light modulator of the projector, spatial extent where a luminous flux capable of being effectively handled is present can be expressed as a product of area and solid angle (Etendue, Geometrical Extent). The product of area and solid angle is stored in the optical system. Therefore, if the spatial extent of the light source becomes wider, the spatial extent, where the luminous flux incident on the spatial light modulator is present, increases. However, an angle of the luminous flux that can be captured by the spatial light modulator is limited, which makes it difficult to effectively use the luminous flux from the light source. When a plurality of LEDs is arranged in an array to increase the light amount, the area (spatial extent) of the light source becomes also wider. Therefore, in the projector, even if the LEDs are simply arranged in an array to increase the light amount, it is difficult to effectively use all the luminous fluxes from the light source because the etendue is stored. As a result, the light amount cannot be increased.

An object of the present invention is to provide a display device capable of displaying a high-luminance image with a wide color reproduction range under simple control, a lighting device capable of supplying high-intensity illumination light with high color purity, and a projector including the lighting device.

SUMMARY OF THE INVENTION

It is an object of the present invention to solve at least the problems in the conventional technology. The present invention provides a display device that includes a light source device that includes first to fourth solid-state light sources that emit first to fourth illumination lights, respectively; a spatial light modulator that modulates the first to the fourth illumination lights; and a controller that controls operation of the light source device to allow the first and the second illumination lights to time-sequentially enter an identical illumination area of the spatial light modulator, and to allow the third and the fourth illumination lights to individually enter the spatial light modulator so as to avoid the third and the fourth illumination lights from being superposed on the first and the second illumination lights. Here, the term of "solid-state light source" includes an LED, an electroluminescence (EL) element, and a laser diode (LD) element. The expression of "to avoid the third and the fourth illumination lights from being superposed on the first and the second illumination lights" means that the third and the fourth illumination lights are emitted in different states, on a time-basis or a spatial-basis, from states of the first and the second illumination lights. In other words, it is avoided to simultaneously illuminate an identical portion with different illumination lights.

In the display device, the controller allows the first and the second illumination lights to time-sequentially enter the identical illumination area of the spatial light modulator, and allows the third and the fourth illumination lights to individually enter the spatial light modulator so as to avoid the third and the fourth illumination lights from being superposed on the first and the second illumination lights. Therefore, the spatial light modulator can be configured without using a filter, which makes it possible to prevent occurrence of the loss of light amount in the filter. That is, efficient illumination allows a display of a high-luminance color image with a wide color reproduction range.

As an exemplary embodiment of the present invention, it is preferable that the spatial light modulator includes a first spatial-light modulating device that corresponds to the first and the second illumination lights; a second spatial-light modulating device that corresponds to the third illumination light; and a third spatial-light modulating device that corresponds to the fourth illumination light, and the controller allows the third and the fourth illumination lights to enter the second and the third spatial-light modulating devices, respectively, and allows the first and the second illumination lights to time-sequentially enter the identical illumination area of the first spatial-light modulating device. Here, the term of "spatial-light modulating device" is an optical device typified by, for example, a liquid-crystal light valve, and includes a digital mirror device. In this case, the three spatial-light modulating devices allow four colors to be displayed, and it is also possible to form a high-luminance image by causing the first or the second solid-state light source, the third solid-state light source, and the fourth solid-state light source to concurrently and efficiently operate.

As an exemplary embodiment of the present invention, it is preferable that the first and the second illumination lights have peak wavelengths that are mutually approximate to each other, and the third and the fourth illumination lights have respective peak wavelengths that are apart from the peak wavelengths of the first and the second illumination lights. In this case, for only approximate two colors, one frame is divided to form subframes, and the first spatial-light modulating device and optical systems provided around it can be made suitable for the first and the second illumination lights. Further, the second and the third spatial-light modulating devices are allowed to operate individually for the third and the fourth illumination lights, respectively, which allows conventional signal processing for these two colors to be used as it is.

As an exemplary embodiment of the present invention, it is preferable that the display device includes a wave combining unit that, when the first and the second illumination lights are incident on the wave combining unit, combines the first and the second illumination lights makes the combined illumination light to enter the spatial light modulator; and a polarization converter that converts either one of the first and the second illumination lights to a linearly polarized light in a predetermined direction to allow the polarized light converted to enter the wave combining unit. In this case, the polarization converter converts one of the illumination lights to a linearly polarized light in a predetermined direction and allows it to enter the wave combining unit. Therefore, even if the wave combining characteristic of the wave combining unit is polarization-dependent related to the wavelength of the second illumination light, a polarized light according to the characteristic is allowed to enter the wave combining unit. Thus, the first and the second illumination lights can be combined efficiently, which makes it possible to improve the intensity of an illumination light finally obtained by the wave combination. Here, the term of "polarization-dependent" means that the characteristic such as wave combining efficiency of the wave combining unit is different depending on polarized states of incident lights.

As an exemplary embodiment of the present invention, it is preferable that the wave combining unit is a light combining element that uses transmission and reflection of light, and a peak wavelength of the one illumination light is set in a difference generation range that is between a first edge wavelength of the linearly polarized light in the predetermined direction in the light combining element and a second edge wavelength of a linearly polarized light in a direction perpendicular to the predetermined direction of the light combining element. In this case, in the transmission and reflection characteristics of the light combining element, even if there is a difference generation range such that a difference between the edge wavelengths of the s-polarized light and the p-polarized light is too large to be negligible, it is possible to improve the intensity by the wave combination that compensates for the difference.

As an exemplary embodiment of the present invention, it is preferable that the spatial light modulator further includes a single spatial-light modulating device which all the first to the fourth illumination lights enter and the controller allows the first to the fourth illumination lights to time-sequentially enter an identical illumination area of the single spatial-light modulating device. In this case, the single spatial-light modulating device allows a bright and four-color display.

As an exemplary embodiment of the present invention, it is preferable that a total illumination time of the first and the second illumination lights in one frame is equal to each illumination time of the third and the fourth illumination lights, and intensity of the first and the second illumination lights is relatively higher than intensity of the third and the fourth illumination lights. In this case, illuminations with the first and the second illumination lights are time-sequentially performed in one frame, that is, the illuminations are performed in subframes, which causes each illumination time to be reduced, but the reduction can be compensated for by increasing the intensity of the first and the second illumination lights.

As an exemplary embodiment of the present invention, it is preferable that the controller allows the first and the second illumination lights to time-sequentially enter the identical illumination area of the spatial light modulator at a predetermined intensity ratio corresponding to a color tone or a white level of an image. Note that a ratio between the illumination times of the first and the second illumination lights is set to, for example, 1:1. In this case, an adequate display corresponding to the color tone and the white level of an image becomes possible.

As an exemplary embodiment of the present invention, it is preferable that the controller allows the first and the second illumination lights to respectively enter the spatial light modulator in each illumination time of two periods into which a frame time is divided and at an intensity twice as high as an intensity of illumination light that is the first illumination light singly used. In this case, a bright and well-balanced four-color display becomes possible.

As an exemplary embodiment of the present invention, it is preferable that the controller allows the first and the second illumination lights to time-sequentially enter the identical illumination area of the spatial light modulator at a predetermined time ratio corresponding to a color tone or a white level of an image. Note that a ratio between the illumination intensities of the first and the second illumination lights is set to, for example, 1:1. In this case, an adequate display corresponding to the color tone and the white level of an image becomes possible.

The present invention provides a projector that includes a display device that includes a light source device that includes first to fourth solid-state light sources that emit first to fourth illumination lights, respectively; a spatial light modulator that modulates the first to the fourth illumination lights; and a controller that controls operation of the light source device to allow the first and the second illumination lights to time-sequentially enter an identical illumination area of the spatial light modulator, and to allow the third and the fourth illumination lights to individually enter the spatial light modulator so as to avoid the third and the fourth illumination lights from being superposed on the first and the second illumination lights; and a projection optical system that projects an image of the spatial light modulator. In such a projector, even if a color image with a wide color reproduction range is projected, efficient illumination allows the color image projected to be made high intensity.

The present invention provides a lighting device that includes a light source device that includes first and second light sources that emit first and second illumination lights, respectively, each of which has a peak wavelength different from each other; a wave combining unit that combines the first and the second illumination lights when the first and the second illumination lights are incident on the wave combining unit, and emits illumination lights combined; and a polarization converter that converts the second illumination light to a linearly polarized light in a predetermined direction to allow it to enter the wave combining unit. In such a lighting device, the polarization converter converts the second illumination light to a linearly polarized light in a predetermined direction to allow it to enter the wave combining unit. Therefore, even if the wave combining characteristic of the wave combining unit related to the wavelength of the second illumination light is polarization-dependent, a polarized light according to the characteristic can be made to enter the wave combining unit. This allows the first and the second illumination lights to be efficiently combined, and allows the intensity of an illumination light finally obtained by the wave combination to be improved.

As an exemplary embodiment of the present invention, it is preferable that the wave combining unit is a light combining element that uses transmission and reflection of light, and a peak wavelength of the one illumination light is set in a difference generation range that is between a first edge wavelength of the linearly polarized light in the predetermined direction in the light combining element and a second edge wavelength of a linearly polarized light in a direction perpendicular to the predetermined direction of the light combining element. In this case, in the transmission and reflection characteristics of the light combining element, even if there is a difference generation range such that a difference between the edge wavelengths of both the s- and the p-polarized lights is too large to be negligible, it is possible to improve the intensity by the wave combination that compensates for the difference.

As an exemplary embodiment of the present invention, it is preferable that a central wavelength of the first illumination light is set in a range outside the difference generation range yet close to the difference generation range. In this case, a difference in wavelengths between the first illumination light and the second illumination light can be reduced, which makes it possible to emit high-intensity illumination lights of a practically identical color.

As an exemplary embodiment of the present invention, it is preferable that the wave combining unit is a dichroic mirror. In this case, an optical element with a simple structure allows efficient wave combination.

As an exemplary embodiment of the present invention, it is preferable that the first and the second light sources are solid-state light sources. In this case, although the light source is easily controlled, it is possible to increase the intensity of light with a specific wavelength.

As an exemplary embodiment of the present invention, it is preferable that the polarization converter includes a rod integrator on which light emitted from the second illumination light is incident; a reflection-type polarizing plate that is provided at an emission end of the rod integrator; and a reflecting unit that returns a light, having passed through the rod integrator and being returned from the reflection-type polarizing plate, to an incidence end of the rod integrator. In this case, the reflecting unit also reuses a return light reflected by the reflection-type polarizing plate, which makes it possible to efficiently extract the second illumination light, which is a linearly polarized light in a predetermined direction, without any loss.

As an exemplary embodiment of the present invention, it is preferable that the polarization converter includes a pair of polarization beam splitters on which lights emitted from the second light source are sequentially incident; and a waveplate that is provided at an emission side of the polarization beam splitter in a subsequent stage. In this case, it is possible to efficiently extract the highly polarized second illumination light without any loss.

As an exemplary embodiment of the present invention, it is preferable that both of the first and the second illumination lights belong to any one of three primary colors. In this case, it is possible to easily increase the luminance of any one of the three primary colors without any loss of color purity.

The present invention provides a projector comprising a lighting device that includes a light source device that includes first and second light sources that emit first and second illumination lights, respectively, each of which has a peak wavelength different from each other; a wave combining unit that combines the first and the second illumination lights when the first and the second illumination lights are incident on the wave combining unit, and emits illumination lights combined; and a polarization converter that converts the second illumination light to a linearly polarized light in a predetermined direction to allow it to enter the wave combining unit; a spatial-light modulating device illuminated by the lighting device; and a projection lens that projects an image of the spatial-light modulating device.

In the above projector, the lighting device further includes third and fourth light sources that emit third and fourth illumination lights, respectively, each of which belongs to one of three primary colors, that is different from a primary color thereof to which the first and the second illumination lights belong and spatial-light modulating device further includes three spatial-light modulating devices that individually modulate the first and the second illumination lights, the third illumination light, and the fourth illumination light when the first and the second illumination lights, the third illumination light, and the fourth illumination light are incident thereon, respectively; and a light combining member that combines the illumination lights modulated from the spatial-light modulating devices to be emitted, and the projection lens projects images of the three spatial-light modulating devices, the images being combined through the light combining member.

The projector includes the lighting device, which makes it possible to efficiently combine the first and the second illumination lights. This allows improved intensity of the illumination lights of the three primary colors finally obtained by the wave combination, and a high-luminance color image can be projected by using the three spatial-light modulating devices.

As an exemplary embodiment of the present invention, it is preferable that the spatial-light modulating device is a liquid-crystal light valve. In this case, the device that is compact can project a high-luminance and high-definition image.

The present invention provides a lighting device that includes a light source unit that includes at least two light sources of a first light source that supplies a first illumination light and a second light source that supplies a second illumination light having a wavelength range different from that of the first illumination light; and a wave combining unit that combines the first illumination light and the second illumination light both of which are traveling from different directions, and emits the illumination lights combined, and the light source unit and the wave combining unit are arranged so that an angle of the first illumination light incident on the wave combining unit and an angle of the second illumination light incident on the wave combining unit are substantially the same as each other, and are less than 45°.

As the wave combining unit, for example, the dichroic mirror can be used. Formed on the dichroic mirror is a dielectric multilayer film of which a film thickness, a refractive index, and the number of lamination layers are controlled. As explained above, a wavelength (hereinafter, "edge wavelength") that is a cutoff frequency in a range, in which the transmittance characteristic or the reflectance characteristic of the dichroic mirror is largely changed, is different from another cutoff frequency between the p-polarized light and the s-polarized light. Generally, the dichroic mirror is often designed so that desired transmittance characteristic or reflectance characteristic can be obtained for light in a predetermined angle range including an incident angle of 45°. In this case, the edge wavelength of the p-polarized light may become sometimes different from the edge wavelength of the s-polarized light by about tens of nanometers (nm) or more. The reflectance characteristic or the transmittance characteristic of the dichroic mirror depends on an incident angle of light. In other words, by changing the incident angle of light on the dichroic mirror, the reflectance characteristic or the transmittance characteristic also changes.

In the present invention, the light source unit and the wave combining unit are arranged so that an angle of the first illumination light incident on the wave combining unit and an angle of the second illumination light incident on the wave combining unit are substantially the same as each other. A piece of dichroic mirror is studied as a typical example of the wave combining unit. The first illumination light enters from a first plane side of the dichroic mirror. The second illumination light enters from a second plane side that is different from the first plane side of the dichroic mirror. The dichroic mirror allows the first illumination light incident from the first plane side to reflect thereon to guide it toward a predetermined direction. Moreover, the dichroic mirror allows the second illumination light incident from the second plane side to pass therethrough to guide it toward the predetermined direction. Consequently, the dichroic mirror, which is the wave combining unit, can combine the first illumination light with the second illumination light to guide the illumination lights combined toward the identical direction. In the present invention, the first illumination light and the second illumination light enter the wave combining unit from different directions. For example, in the typical example, the first illumination light enters it from the first plane side and the second illumination light enters it from the second plane side. Furthermore, the incident angles of the respective illumination lights are made the same as each other. Here, the incident angle is an angle between a normal line of an incident plane and an incident ray. Therefore, the first illumination light having reflected by the dichroic mirror and the second illumination light having passed through it are combined in the identical direction and are output. Thus, it is possible to accurately combine the two illumination lights.

Furthermore, the present invention is configured so that an angle of the first illumination light incident on the wave combining unit and an angle of the second illumination light incident on the wave combining unit are less than 45°. If the incident angle of light is about zero, i.e., vertical incidence, a polarized state of the p-polarized light or the s-polarized light does not affect the characteristics of the wave combining unit. Therefore, in the case of the vertical incidence, the influence of the polarized state of the incident light can be reduced. As is clearly understood from this, the polarization-dependence exerts less influence on the transmittance characteristic or the reflectance characteristic of the dichroic mirror as the incident angle of light is made closer to a vertical direction, that is, a direction of almost zero. As a result, by setting the incident angle to less than 45°, the difference between the edge wavelength of the p-polarized light and the edge wavelength of the s-polarized light in the dichroic mirror can be reduced. This allows the peak wavelength of the first illumination light and the peak wavelength of the second illumination light to be close to each other. Therefore, the two illumination lights with the close peak wavelengths are accurately combined in the same manner as explained above, which makes it possible to supply high-intensity illumination light with high color purity.

As an exemplary embodiment of the present invention, it is preferable that the light source unit further includes at least one third light source that supplies a third illumination light having a wavelength range different from the wavelength ranges of the first illumination light and the second illumination light, the wave combining unit includes at least two wave combining elements of a first wave combining element that combines the first illumination light with the second illumination light to emit the illumination lights combined, and a second wave combining element that combines the illumination lights combined emitted from the first wave combining element with the third illumination light to be emitted, and the third light source and the second wave combining element are arranged so that an angle of the third illumination light incident on the second wave combining element and an angle of the illumination lights combined incident on the second wave combining element are substantially the same as each other, and are less than 45°. In this mode, the wave combining unit includes at least the first wave combining element and the second wave combining element. A first dichroic mirror and a second dichroic mirror can be used for the first wave combining element and the second wave combining element, respectively. The first dichroic mirror, which is the first wave combining element, combines the first illumination light with the second illumination light as explained above to output high-intensity combined lights with high color purity. Furthermore, the second dichroic mirror, which is the second wave combining element, combines the combined lights with the third illumination light in the same manner as that of the first wave combining element to obtain high-intensity illumination light with high color purity. In this mode, it is possible to combine at least three illumination lights in which three peak wavelengths of the first illumination light, the second illumination light, and the third illumination light are close to one another. Therefore, further higher-intensity illumination light can be obtained.

As an exemplary embodiment of the present invention, it is preferable that the wave combining unit is a light combining element that uses transmitting action and reflecting action of light, the light combining element has a first edge wavelength and a second edge wavelength that are different from each other, the first edge wavelength being in a wavelength range where transmittance characteristic or reflectance characteristic for a linearly polarized light in a predetermined direction of vibration is switched, and the second edge wavelength being in a wavelength range where transmittance characteristic or reflectance characteristic for a linearly polarized light in a direction of vibration substantially perpendicular to the predetermined direction of vibration is switched, and the lighting device further comprises a polarization converter that converts at least one of the first illumination light and the second illumination light to a linearly polarized light in the predetermined direction of vibration or to a linearly polarized light in a direction of vibration substantially perpendicular to the predetermined direction of vibration, wherein at least a part of the wavelength range of the first illumination light or of the second illumination light is superimposed on a wavelength range between the first edge wavelength and the second edge wavelength. If the dichroic mirror is used for the light combining element, the reflectance characteristic or the transmittance characteristic between the p-polarized light and the s-polarized light is different in a wavelength range between the first edge wavelength and the second edge wavelength. Therefore, a part of a wavelength range of non-polarized light incident on the dichroic mirror, that is, of randomly polarized light may sometimes overlap the wavelength range between the first edge wavelength and the second edge wavelength. In this case, a part of the incident lights is reflected by the dichroic mirror although all the incident lights are desired to pass through it, which causes the loss of light amount to occur. Alternatively, a part of the incident lights passes through the dichroic mirror although all the incident lights are desired to be reflected thereby, which causes the loss of light amount to occur. In this mode, the polarization converter is further provided. This polarization converter converts at least one of the first illumination light and the second illumination light, of which a part of the wavelength range overlaps the wavelength range between the first edge wavelength and the second edge wavelength, to a linearly polarized light in a predetermined direction of vibration or a linearly polarized light in a direction of vibration substantially perpendicular to the predetermined direction of vibration. Thus, it is possible to reduce the loss of light amount of all the illumination lights to obtain high-intensity illumination light.

The present invention provides a projector comprising a lighting device including a light source unit that includes at least two light sources of a first light source that supplies a first illumination light and a second light source that supplies a second illumination light having a wavelength range different from that of the first illumination light; and a wave combining unit that combines the first illumination light and the second illumination light both of which are traveling from different directions to emit the illumination lights combined; a spatial-light modulating device that modulates the illumination lights from the lighting device according to an image signal; and a projection lens that projects the illumination lights modulated, and the light source unit and the wave combining unit are arranged so that an angle of the first illumination light incident on the wave combining unit and an angle of the second illumination light incident on the wave combining unit are substantially the same as each other, and are less than 45°. Provision of the lighting device allows the spatial-light modulating device to be illuminated with high-color-purity and high-intensity illumination light. Thus, it is possible to obtain a projected image with bright and high color purity.

BRIEF DESCRIPTION OF THE DRAWINGS

FIG. 16 is a graph for explaining transmittance characteristic of the dichroic mirror;

FIG. 20B is an optical characteristic diagram of the dichroic mirror for the conventional lighting device;

DETAILED DESCRIPTION

Exemplary embodiments of the present invention are explained in detail below with reference to the accompanying drawings.

Figure 1:
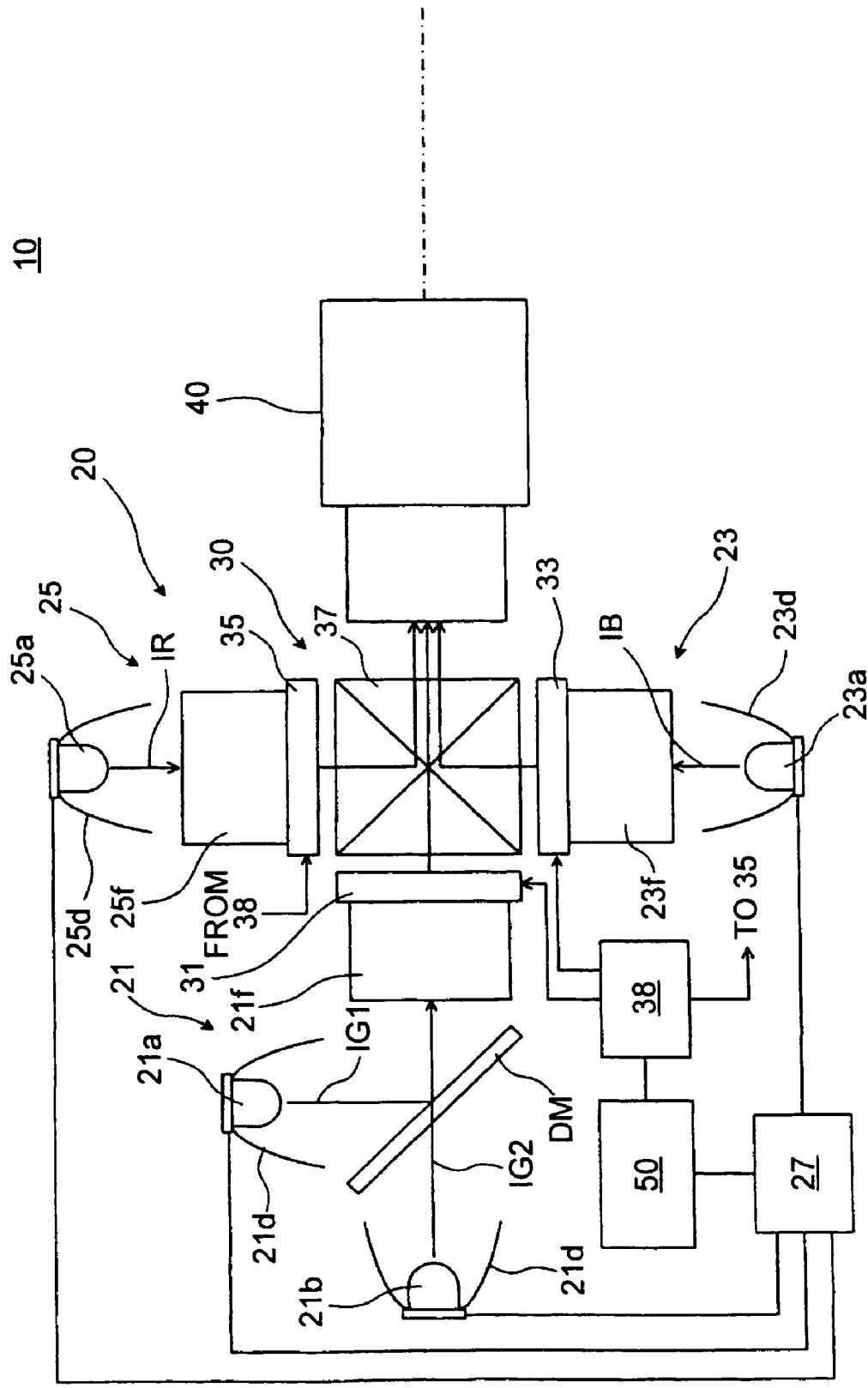
FIG. 1 is a diagram of a structure of a projector according to a first embodiment of the present invention.

FIG. 1 is a block diagram for conceptually explaining a structure of a projector 10 according to a first embodiment of the present invention. The projector 10 includes a lighting device 20, a light modulating device 30, a projection lens 40, and a controller 50. The lighting device 20 includes a G-light lighting device 21, a B-light lighting device 23, a R-light lighting device 25, and a light-source drive unit 27. The light modulating device 30 includes three transmission-type liquid-crystal light valves 31, 33, and 35 that are spatial-light modulating devices, a cross dichroic prism 37 that is a light combining member, and an element drive unit 38 that outputs a drive signal to the transmission-type liquid-crystal light valves 31, 33, and 35.

In the lighting device 20, the G-light lighting device 21 includes an LED 21a as a first light source and an LED 21b as a second light source that emit illumination lights, respectively, as a pair whose central wavelengths are comparatively close to each other. The G-light lighting device 21 also includes concave reflecting mirrors 21d that collect illumination lights from the LEDs 21a and 21b, respectively, and a dichroic mirror DM as a light combining element that combines the illumination lights from both the LEDs 21a and 21b. The LEDs 21a and 21b and the concave reflecting mirrors 21d form the light source device.

The LEDs 21a and 21b emit a G1 light and a G2 light, respectively, which form a pair included in a range of green (G) of three primary colors and of which central wavelengths are different from each other. A first illumination light IG1 from the LED 21a is entirely recovered by the concave reflecting mirror 21d to be incident on the dichroic mirror DM, and is reflected thereby to enter a rod lens 21f. On the other hand, a second illumination light IG2 from the LED 21b is also entirely recovered by the concave reflecting mirror 21d to be incident on the dichroic mirror DM. The second illumination light IG2 incident on the dichroic mirror DM passes through it and is combined with the first illumination light IG1 therein to enter the rod lens 21f. The first and the second illumination lights IG1 and IG2 incident on the rod lens 21f are made uniform thereby to enter the transmission-type liquid-crystal light valve 31 for G light that is a first spatial-light modulating device. The rod lens 21f is also referred to as rod integrator that is a cylinder or a square column of which side face is a reflective surface. Luminous fluxes that have different incident angles to be incident on the rod lens 21f are subjected to wavefront splitting and superimposition on each other to be made uniform, and the luminous fluxes made uniform are output.

The B-light lighting device 23 includes an LED 23a that is a third light source, a concave reflecting mirror 23d, and a rod lens 23f. The LED 23a and the concave reflecting mirror 23d form the light source device. The LED 23a emits a B light included in a range of blue (B) of the three primary colors. A third illumination light IB from the LED 23a is entirely recovered by the concave reflecting mirror 23d to be incident on the rod lens 23f. The third illumination light IB incident on the rod lens 23f is made uniform thereby to enter the transmission-type liquid-crystal light valve 33 for B light that is a second spatial-light modulating device.

The R-light lighting device 25 includes an LED 25a that is a fourth light source, a concave reflecting mirror 25d, and a rod lens 25f. The LED 25a and the concave reflecting mirror 25d form the light source device. The LED 25a emits a R light included in a range of red (R) of the three primary colors. A fourth illumination light IR from the LED 25a is entirely recovered by the concave reflecting mirror 25d to be incident on the rod lens 25f. The fourth illumination light IR incident on the rod lens 25f is made uniform thereby to enter the transmission-type liquid-crystal light valve 35 for R light that is a third spatial-light modulating device.

The lights from the lighting devices 21, 23, and 25 incident on the transmission-type liquid-crystal light valves 31, 33, and 35 are two-dimensionally modulated thereby, respectively. The colored lights having passed through the transmission-type liquid-crystal light valves 31, 33, and 35, respectively, are combined with one another by the cross dichroic prism 37 that is the light combining member, and the combined lights are emitted from one of its side faces. An image of the combined lights emitted from the cross dichroic prism 37 enters the projection lens 40 to be projected onto a screen (not shown) provided on the outside of the projector 10 at an appropriate enlargement ratio. In other words, the projector 10 projects an image obtained by combining images of colors G1, G2, B, and R formed in the respective transmission-type liquid-crystal light valves 31, 33, and 35 onto the screen as a moving image or a still image. Polarizing plates are arranged, although they are not shown, at respective appropriate locations around the transmission-type liquid-crystal light valves 31, 33, and 35 so as to illuminate these transmission-type liquid-crystal light valves 31, 33, and 35 with polarized lights to be read.

The controller 50 outputs control signals to the light-source drive unit 27 to adjust light emission timings and light emission intensities of the LEDs 21a, 21b, 23a, and 25a provided in the lighting devices 21, 23, and 25. More specifically, the LED 21a is lit at a subframe in a first half of two portions into which a display period of one frame is divided, and the LED 21b is lit at a subframe in a second half thereof. The LEDs 23a and 25a are lit concurrently over the display period of the one frame. At this time, for the G light, the light emission intensity of the LEDs 21a and 21b can be set to, for example, twice the case of singly using the illumination light from the LED 21a without using the LED 21b.

Furthermore, the controller 50 outputs control signals to the element drive unit 38 to form a two-dimensional distribution of polarization characteristics corresponding to each intensity of projection images in the transmission-type liquid-crystal light valves 31, 33, and 35. More specifically, the G-light transmission-type liquid-crystal light valve 31 performs a display corresponding to the intensity of a projection image of G1 at the subframe in the first half of the two portions into which the display period of one frame is divided, and performs a display corresponding to the intensity of a projection image of G2 at the subframe in the second half thereof. The B-light transmission-type liquid-crystal light valve 33 and the R-light transmission-type liquid-crystal light valve 35 perform displays corresponding to respective intensities of projection images of B and R over the display period of the one frame.

Figure 2:
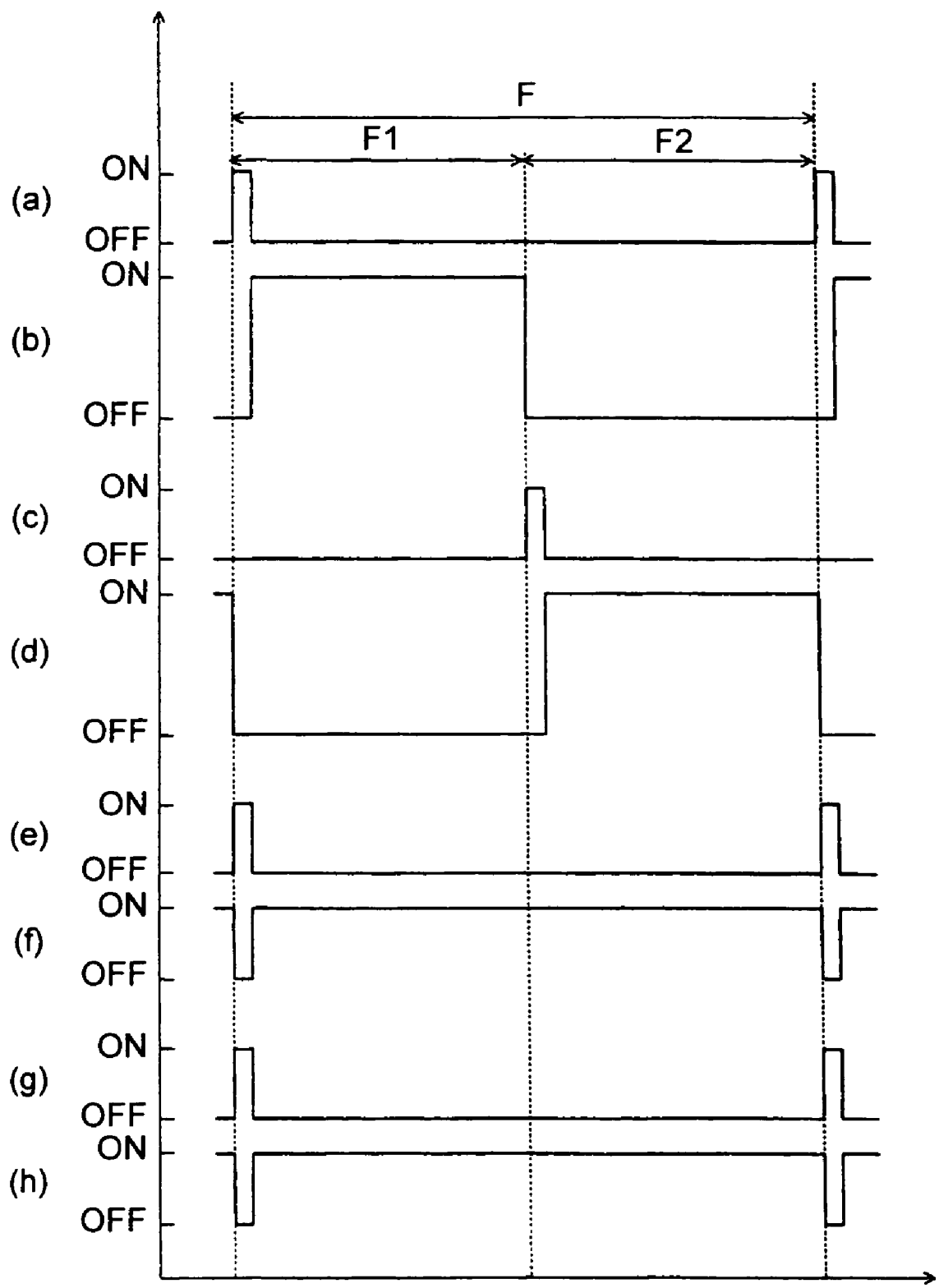
FIG. 2 is a diagram for explaining operation of the projector according to the first embodiment.

FIG. 2 is a timing chart for explaining the operation of the projector 10 according to the first embodiment. The chart (a) represents a write period of a G1-luminance signal, the chart (b) represents a G1-light emission period, and the charts (c), (e), and (g) represent write periods of a G2-luminance signal, a B-luminance signal, and a R-luminance signal, respectively. Moreover, the charts (d), (f), and (h) represent G2-light, B-light, and R-light emission periods, respectively. If the transmission-type liquid-crystal light valve is used, light is emitted from LED after the response of the liquid crystal. Therefore, the G1 light, the G2 light, the B light, and the R light are emitted in respective periods of the emission periods as shown in FIG. 2.

As is apparent from the chart (a), the G1-luminance signal is written to the G-light transmission-type liquid-crystal light valve 31 corresponding to the G1 light at the beginning of a first-half subframe F1. As shown in the chart (b), the LED 21a corresponding to the G1 light is lit, and the G-light transmission-type liquid-crystal light valve 31 is illuminated with the first illumination light IG1. As is apparent from the chart (c), the G2-luminance signal is written to the G-light transmission-type liquid-crystal light valve 31 corresponding to the G2 light at the beginning of a second-half subframe F2. As shown in the chart (d), the LED 21b corresponding to the G2 light is lit, and the G-light transmission-type liquid-crystal light valve 31 is illuminated with the second illumination light IG2. In parallel to the operations, as shown in the chart (e), the B-luminance signal is written to the B-light transmission-type liquid-crystal light valve 33 corresponding to the B light at the beginning of one frame period F. As shown in the chart (f), the LED 23a corresponding to the B light is lit, and the B-light transmission-type liquid-crystal light valve 33 is illuminated with the third illumination light IB. Likewise, as shown in the chart (g), the R-luminance signal is written to the R-light transmission-type liquid-crystal light valve 35 corresponding to the R light at the beginning of the one frame period F. As shown in the chart (h), the LED 25a corresponding to the R light is lit, and the R-light transmission-type liquid-crystal light valve 35 is illuminated with the fourth illumination light IR.

During the operations, the drive current of the LEDs 21a and 21b is set to, for example, about twice a rated current, and the light emission intensity of the LEDs 21a and 21b is set to about twice as high as ordinary intensity. Therefore, even if the LEDs 21a and 21b are lit in the respective subframes period F1 and F2 each of which is a half time of the one frame period F, the intensity having almost the same level of that of the LEDs 23a and 25a can be ensured. The light emission intensity itself of the LEDs 21a and 21b may also be set to twice the light emission intensity of the LEDs 23a and 25a by adjusting the drive current.

On the other hand, the light emission intensity of the LEDs 21a and 21b is not always mutually equal to the light emission intensity of the LEDs 23a and 25a. For example, if the white level undergoes influence of the optical system or the screen, a light-emission intensity ratio between the LEDs 21a and 21b or an intensity ratio between them with respect to the LEDs 23a and 25a can be changed or adjusted as necessary so as to cancel out the influence. If there is a certain tendency in a color tone of an image to be projected or if a particular color is desired to be enhanced, the light-emission intensity ratio between the LEDs 21a and 21b or the intensity ratio between them with respect to the LEDs 23a and 25a can be changed as necessary. In this case, contrast of a particular color can be enhanced, which allows a variety of color images to be provided.

In the example, the one frame period F is divided into two portions to form the subframes F1 and F2, but the one frame period F may also be divided into a pair of subframes at an appropriate time ratio. In this case, the light emission intensities of the LEDs 21a and 21b can be set to proportional to an inverse number of a time of each subframe as required. Assuming that a ratio between a subframe time for G1 light corresponding to the LED 21a and a subframe time for G2 light corresponding to the LED 21b is A:B, a ratio between the light emission intensity of the LED 21a or the drive current and the light emission intensity of the LED 21b or the drive current can be set to, for example, (1/A):(1/B).

As is apparent from the explanation, according to the projector 10 of the present invention, expression with high-luminance and well-balanced four primary colors becomes possible by using the G1 light, the G2 light, the B light, and the R light without a complicated structure of the projector, which makes it possible to easily widen the color reproduction range. It is noted that both of the first and the second illumination lights, the G1 light and the G2 light, have been explained such that they are included in a range (about 490 to 580 nm) of green (G) for convenience in explanation. However, either one of the first and the second illumination lights, the G1 light and the G2 light, may depart from the range of green (G) to be included in a range of red (R) or blue (B).

A projector according to a second embodiment of the present invention is explained below. The same reference signs are assigned to those corresponding to the portions in the first embodiment, and explanation thereof is omitted. The structure of the projector is substantially the same as that of the projector 10 according to the first embodiment. However, there is a difference from the first embodiment in a point such that a polarization converter explained in detail below, i.e., the polarization converter is arranged between the dichroic mirror DM and the LED 21b that is the second light source. If the central wavelength of the LED 21a and the central wavelength of the LED 21b are close to each other, by providing the polarization converter between the dichroic mirror DM and the LED 21b, the waves can be further efficiently combined.

Figure 3:
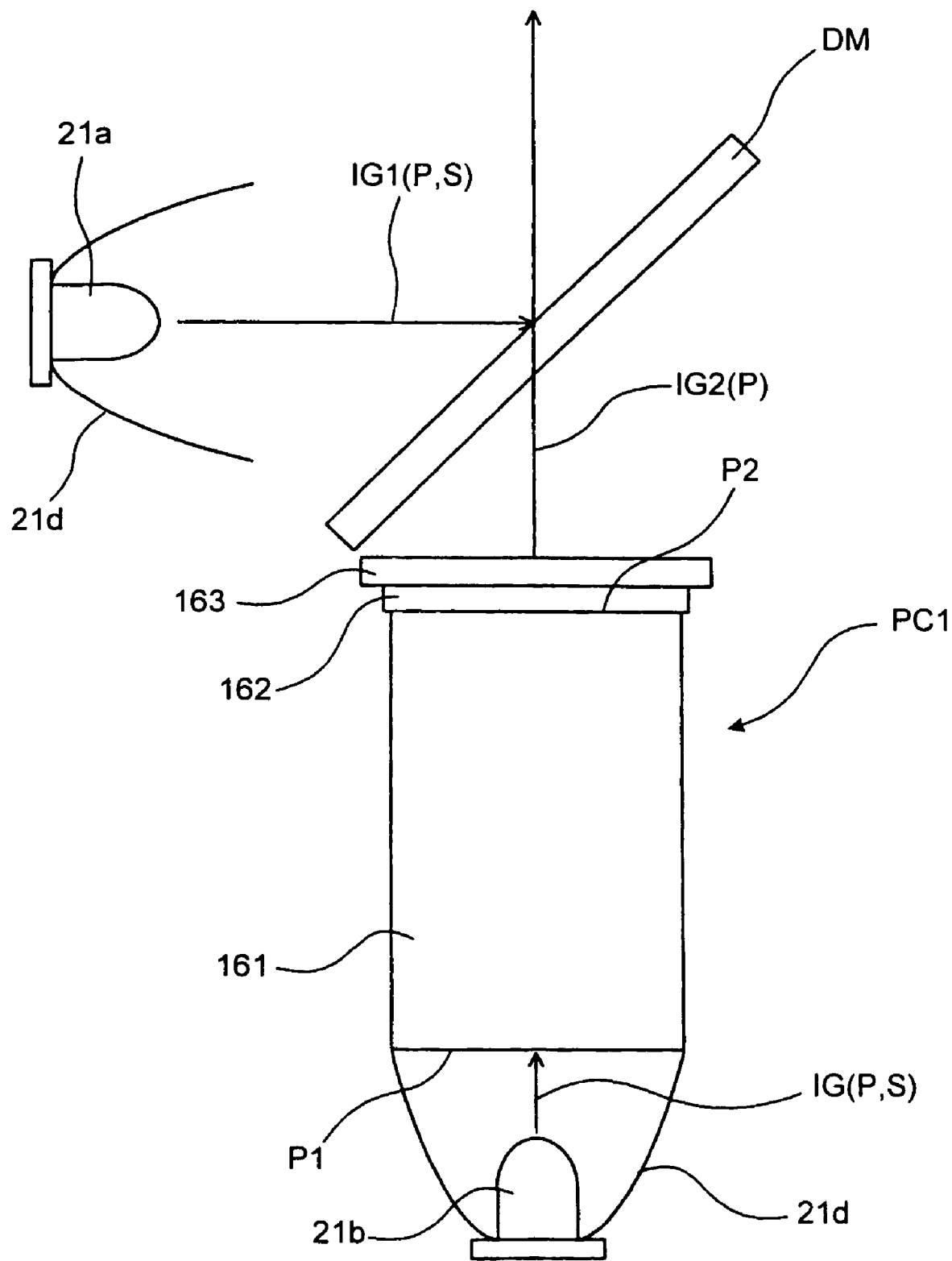
FIG. 3 is a diagram for explaining a part of a projector according to a second embodiment of the present invention.

FIG. 3 is a diagram for explaining a structure of a polarization converter PC1. The polarization converter PC1 includes a rod lens 161 that makes lights uniform, a λ/4 waveplate 162 that changes a polarized state, and a reflection-type polarizing plate 163 that extracts a polarized light component. The second illumination light IG2 emitted from the LED 21b toward the surroundings enters the rod lens 161 from an end P1 side directly or through the concave reflecting mirror 21d. The second illumination light IG2 incident on the rod lens 161 is emitted from another end P2 to sequentially pass through the λ/4 waveplate 162 and the reflection-type polarizing plate 163. During passage of the second illumination light IG2 through the λ/4 waveplate 162, a linearly polarized light component of the second illumination light IG2 is converted to a circularly polarized light. Further, during passage of the second illumination light IG2 through the reflection-type polarizing plate 163, only the p-polarized light thereof selectively passes through it. The second illumination light IG2 reflected by the reflection-type polarizing plate 163 is mainly the s-polarized light, but by passing through the λ/4 waveplate 162, it is converted to a circularly polarized light to be returned to the rod lens 161 through the end P2. The second illumination light IG2 returned to the rod lens 161 reaches the concave reflecting mirror 21d, goes backward to be returned to the rod lens 161, and enters again the λ/4 waveplate 162 and the reflection-type polarizing plate 163. Such a re-incident light is converted from the circularly polarized light to the p-polarized light by the λ/4 waveplate 162 to efficiently pass through the reflection-type polarizing plate 163. As is clear from the explanation, the second illumination light IG2 incident on the dichroic mirror DM from the reflection-type polarizing plate 163 consists of only the p-polarized light to which the light from the LED 21b is efficiently converted.

The dichroic mirror DM reflects the first illumination light IG1 by almost 100% irrespective to directions of polarization as explained in detail below, but reflects only the s-polarized light of the second illumination light IG2 to allow the p-polarized light to pass through it. Therefore, as shown in FIG. 3, by converting the second illumination light IG2 to the p-polarized light, the illumination lights IG1 and IG2 from both the LEDs 21a and 21b can be combined with extremely low loss. Furthermore, since both of the LEDs 21a and 21b are arranged on the respective optical axes, the characteristics of the illumination lights IG1 and IG2 from the LEDs 21a and 21b are made uniform to allow them to enter the G-light transmission-type liquid-crystal light valve 31 as shown in FIG. 1. Therefore, it is possible to increase the use efficiency of the illumination lights IG1 and IG2 by the G-light transmission-type liquid-crystal light valve 31.

A grid-type polarizer can be used as the reflection-type polarizing plate 163. The grid-type polarizer is structured to form stripes of Al or the like, spaced at pitches of about hundreds of nm, on an optical transparent substrate. The grid-type polarizer selectively passes only a polarized light, of incident light, in a predetermined direction and reflects the rest of the incident light. As explained above, the grid-type polarizer has an advantage such that the loss of light amount due to absorption is reduced.

Figure 4:
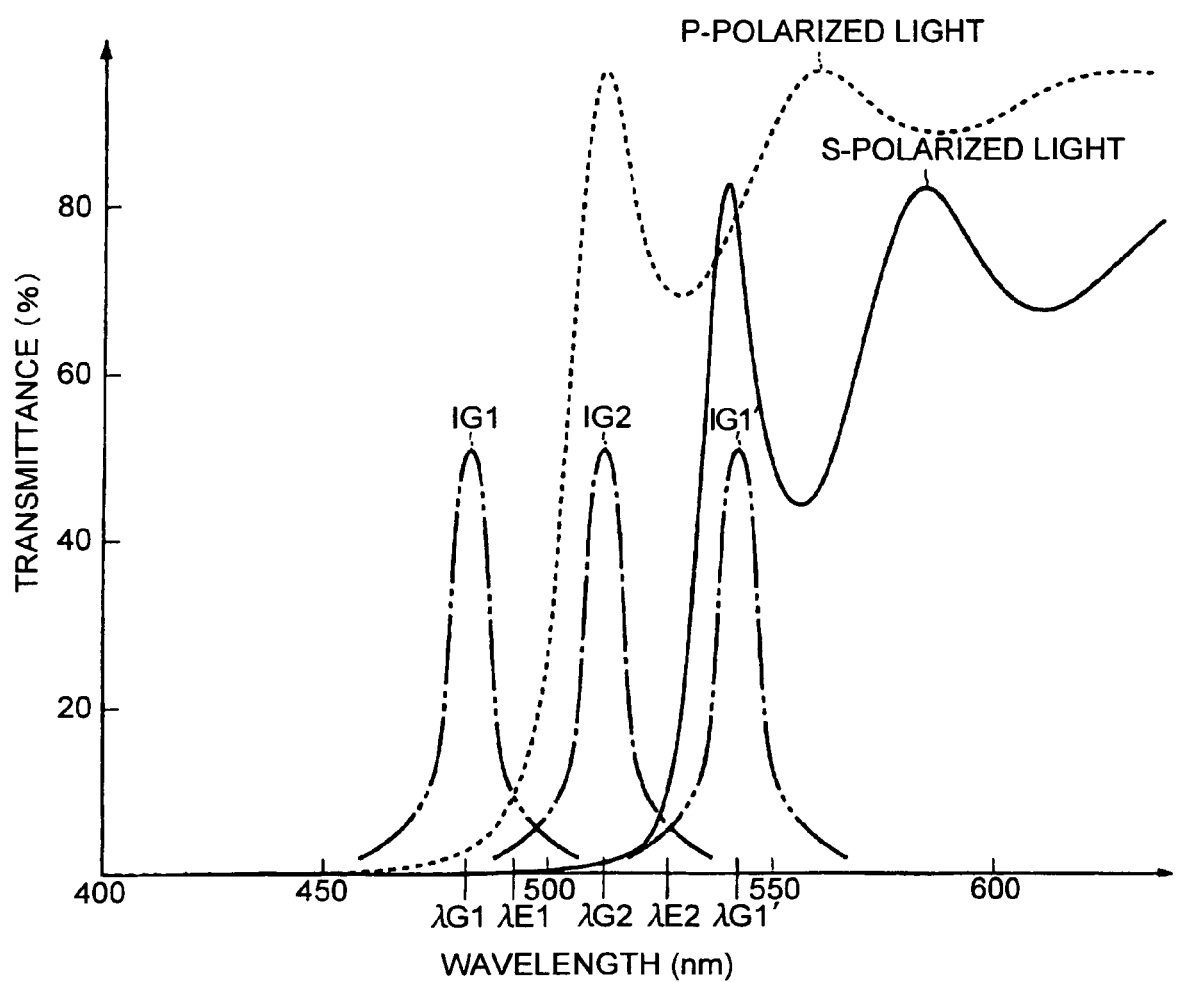
FIG. 4 is a diagram for explaining transmittance characteristic of a dichroic mirror.

FIG. 4 is a graph for explaining characteristics of the dichroic mirror DM. As shown in the graph, the x-axis plots the wavelength (nm) and the y-axis plots the transmittance (%). The dichroic mirror DM is a high-pass filter, and the main plane thereof is tilted by 45° with respect to the optical axis, which causes the transmittance to be polarization-dependent. In other words, a first edge wavelength λE1 corresponding to a transmission edge of a p-polarized light is about 490 nm, and a second edge wavelength λE2 corresponding to a transmission edge of an s-polarized light is, for example, 530 nm. Intensity distributions of the first and the second illumination lights IG1 and IG2 from the LEDs 21a and 21b are depicted in a superimposed manner in arbitrary units (y-axis). As is clear from the graph, a central wavelength λG1 of the illumination light IG1 is set in a shorter wavelength side than the first edge wavelength λE1.

A central wavelength λG2 of the illumination light IG2 is set in between the first edge wavelength λE1 and the second edge wavelength λE2, that is, in a difference generation range that is between the p-polarized light and the s-polarized light and has a different transmittance. Consequently, the first illumination light IG1 from the LED 21a is reflected by the dichroic mirror DM by almost 100%. On the other hand, the second illumination light IG2 from the LED 21b is converted to the p-polarized light with high efficiency through the polarization converter PC1, and therefore, the second illumination light IG2 passes through the dichroic mirror DM at a high rate. In other words, a pair of illumination lights IG1 and IG2 close to each other can be combined efficiently, and the G-light transmission-type liquid-crystal light valve 31 can be sequentially illuminated with high-intensity lights.

Even if the first illumination light IG1 from the LED 21a is made to pass through the dichroic mirror DM and the second illumination light IG2 from the LED 21b is reflected by the dichroic mirror DM, the first illumination light IG1 and the second illumination light IG2 can be combined with each other. For example, the central wavelength λG2 of the second illumination light IG2 is set in between a pair of edge wavelengths λE1 and λE2, and a central wavelength λG1 of a first illumination light IG1 is set in a longer wavelength side than the second edge wavelength λE2. At this time, the first illumination light IG1' from the LED 21a passes through the dichroic mirror DM at a high rate. The polarization converter PC1 is provided so as to selectively pass only an s-polarized light of the incident light. The second illumination light IG2 from the LED 21b is converted to the s-polarized light through the polarization converter PC1 and is reflected by the dichroic mirror DM by almost 100%. As a result, it is possible to reduce the loss of both the illumination lights IG1 and IG2 due to the wave combination of the illumination lights IG1 and IG2 from the LEDs 21a and 21b.

Figure 5:
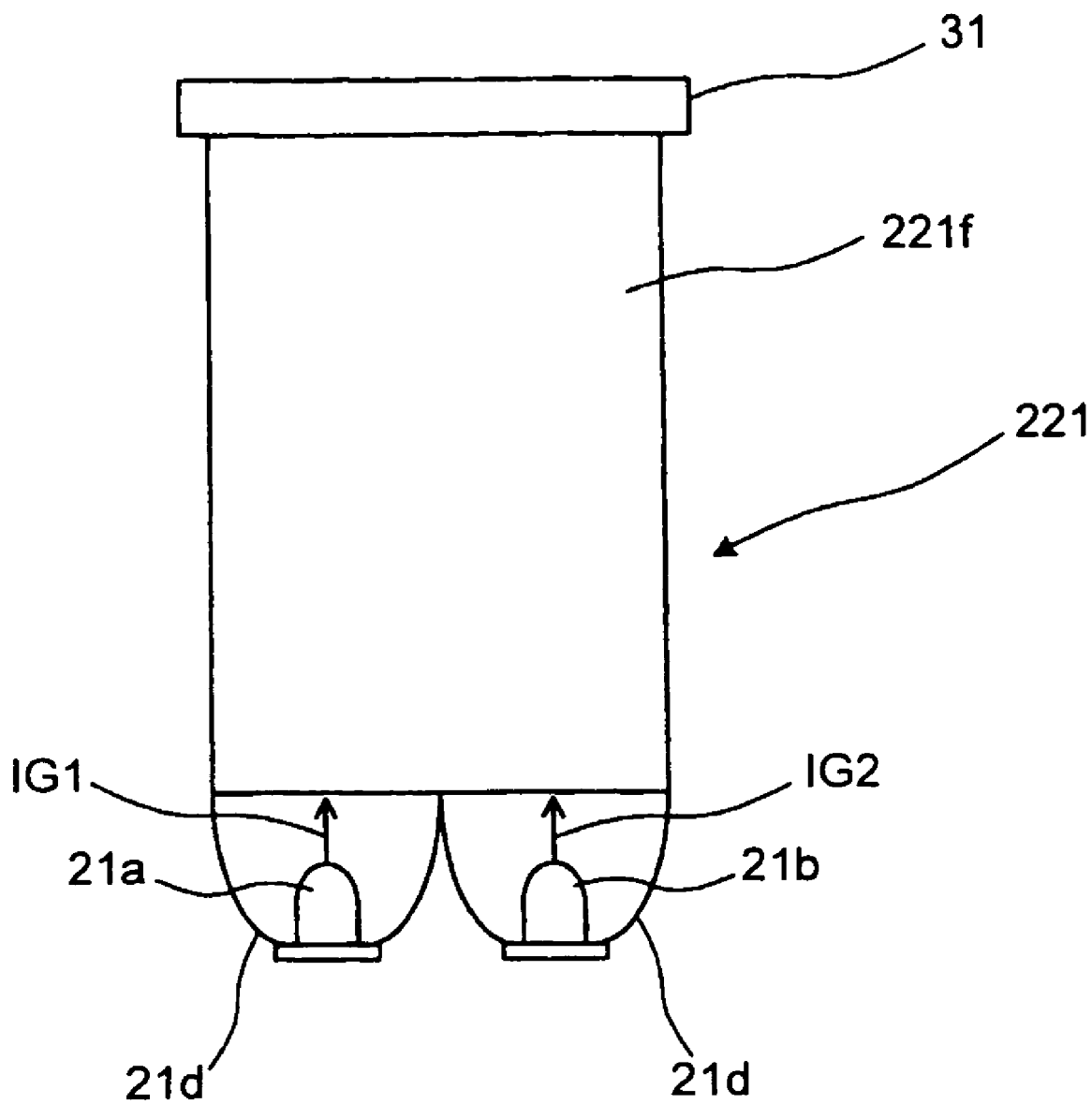
FIG. 5 is a diagram for explaining a part of a projector according to a third embodiment.

FIG. 5 is a diagram for explaining a structure of a G-light lighting device 221 used in a projector according to a third embodiment. The same reference signs are assigned to those corresponding to the portions in the first embodiment, and explanation thereof is omitted. The projector according to the third embodiment has substantially the same structure as that of the projector 10 according to the first embodiment as shown in FIG. 1. In the projector according to the third embodiment, instead of the dichroic mirror in the projector 10 according to the first embodiment, the rod lens is used to combine the first and the second illumination lights IG1 and IG2.

The first illumination light IG1 from the LED 21a, which is the first light source, is entirely recovered by the concave reflecting mirror 21d to enter one end of a rod lens 221f, and is traveling while being reflected by the rod lens 221f to enter the G-light transmission-type liquid-crystal light valve 31. The second illumination light IG2 from the LED 21b, which is the second light source, is also entirely recovered by the concave reflecting mirror 21d to enter one end of the rod lens 221f, and is traveling while being reflected by the rod lens 221f to enter the G-light transmission-type liquid-crystal light valve 31. In this case also, it is possible to reduce the loss of both the illumination lights IG1 and IG2 due to the wave combination of the illumination lights IG1 and IG2 from the LEDs 21a and 21b. Furthermore, the G-light transmission-type liquid-crystal light valve 31 can be sequentially illuminated with high-intensity illumination lights.

Figure 6:
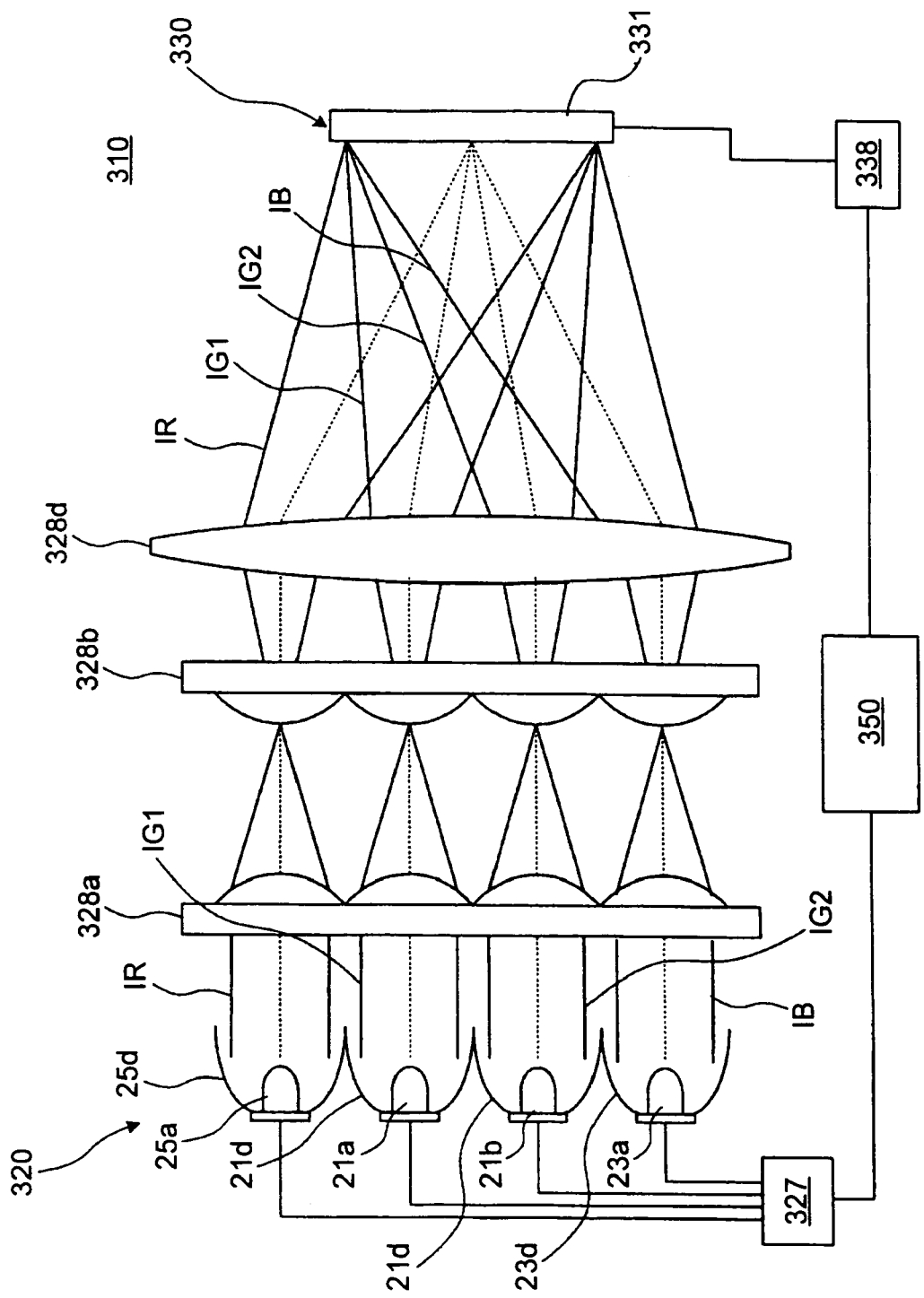
FIG. 6 is a diagram for explaining a structure of a projector according to a fourth embodiment of the present invention.

FIG. 6 is a block diagram for conceptually explaining a structure of a projector 310 according to a fourth embodiment. The same reference signs are assigned to those corresponding to the portions in the first embodiment, and explanation thereof is omitted. The projector 310 includes a lighting device 320, a light modulating device 330, a projection lens (not shown), and a controller 350.

The lighting device 320 includes the LEDs 21a, 21b, 23a, and 25a that are the first, the second, the third, and the fourth light sources, respectively, fly eye optical systems 328a, 328b, and 328d that superimpose lights from the light sources on one another, respectively, to illuminate, and a light-source drive unit 327 that adjusts the light emission intensities and the light emission timings of the LEDs 21a to 25a. The LEDs 21a, 21b, 23a, and 25a emit the first illumination light IG1 corresponding to the G1 light, the second illumination light IG2 corresponding to the G2 light, the third illumination light IB corresponding to the B light, and the fourth illumination light IR corresponding to the R light, respectively. The illumination lights IG1, IG2, IB, and IR from the LEDs 21a to 25a enter the fly eye lenses 328a and 328b directly or through the concave reflecting mirrors 21d, 21d, 23d, and 25d, and enter the superimposing lens 328d while diverging at respective predetermined angles. The illumination lights IG1, IG2, IB, and IR gathered by the superimposing lens 328d are superimposed on one another to enter the light modulating device 330.

The light modulating device 330 includes a transmission-type liquid-crystal light valve 331 as a single unit that is the spatial-light modulating device, and an element drive unit 338 that outputs a drive signal to the transmission-type liquid-crystal light valve 331.

The controller 350 outputs control signals to the light-source drive unit 327 to adjust the light emission timings and the light emission intensities of the LEDs 21a, 21b, 23a, and 25a provided in the lighting device 320. More specifically, the LED 21a is lit at a subframe in a first half of two portions into which a G frame portion is divided, the G frame portion being one of three portions into which one frame period is divided. The LED 21b is lit at a subframe in a second half thereof. The LEDs 23a and 25a are sequentially lit over a B frame portion and a R frame portion of the three portions into which the display period of the one frame is divided.

The controller 50 outputs control signals to the element drive unit 338 to form a two-dimensional distribution of polarization characteristics corresponding to each luminance of projection images of the colors over the transmission-type liquid-crystal light valve 331. More specifically, the transmission-type liquid-crystal light valve 331 performs a display corresponding to the luminance of a projection image of the G1 light at the subframe in the first half of the two portions into which the display period of the G frame portion is divided, and performs a display corresponding to the luminance of a projection image of the G2 light at the subframe in the second half thereof. Furthermore, the transmission-type liquid-crystal light valve 331 performs displays corresponding to projection images of the B light and the R light, respectively, over the display period of the B frame portion and the R frame portion.

Figure 7:
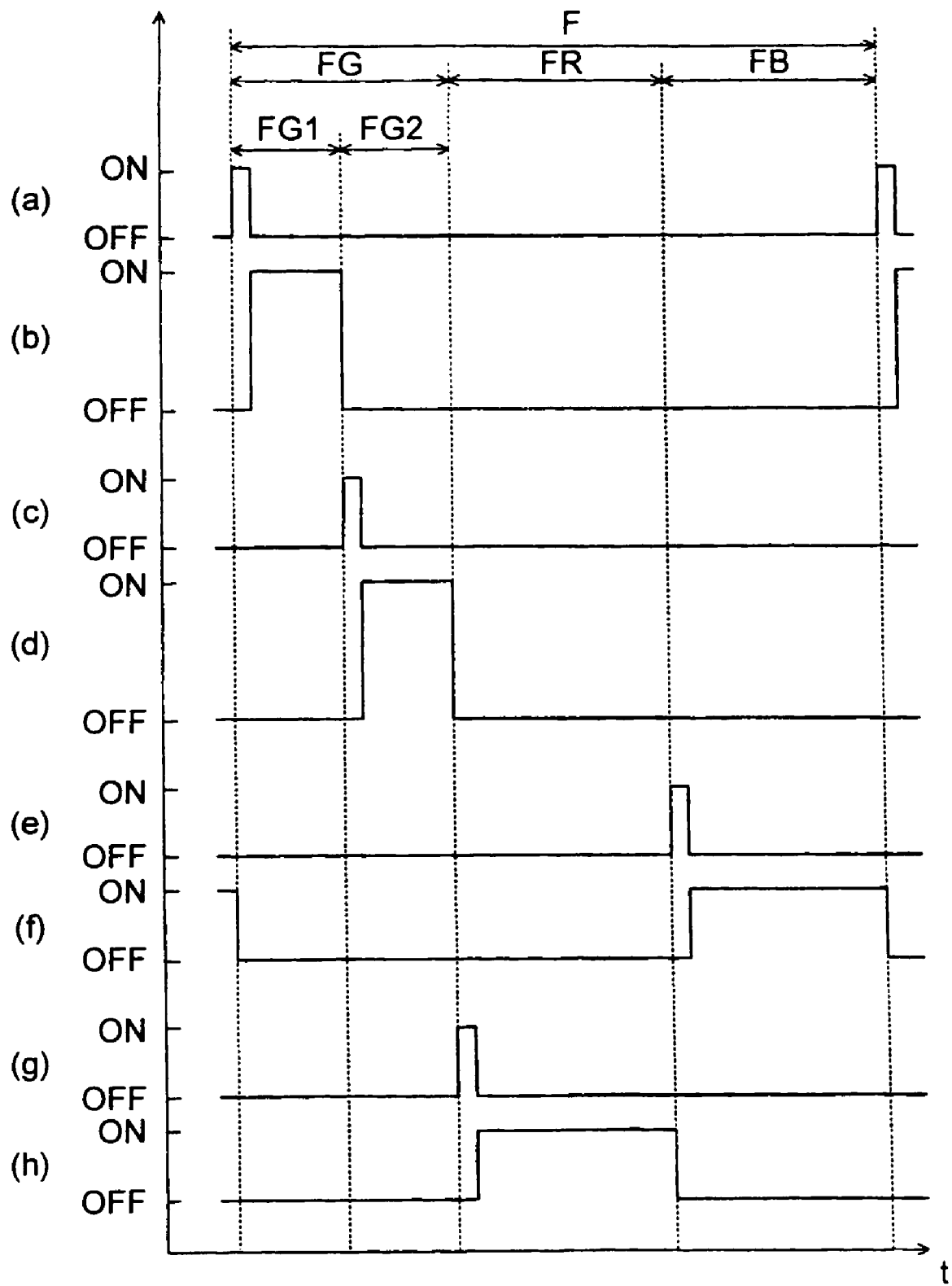
FIG. 7 is a diagram for explaining operation of the projector according to the fourth embodiment.

FIG. 7 is a timing chart for explaining the operation of the projector 310 according to the fourth embodiment. The chart (a) represents a write period of a luminance signal of G1, the chart (b) represents a G1-light emission period, and the charts (c), (e), and (g) represent write periods of a luminance signal of G2, a luminance signal of B, and a luminance signal of R, respectively. The charts (d), (f), and (h) represent G2-light, B-light, and R-light emission periods, respectively.

As is apparent from the chart (a), the luminance signal of G1 light is written to the transmission-type liquid-crystal light valve 331 at the beginning of a first-half subframe FG1 of an initial G frame portion FG. As shown in the chart (b), the transmission-type liquid-crystal light valve 331 is illuminated with the first illumination light IG1. As shown in the chart (c), the luminance signal of G2 light is written to the transmission-type liquid-crystal light valve 331 at the beginning of a second-half subframe FG2 of the G frame portion FG. As shown in the chart (d), the transmission-type liquid-crystal light valve 331 is illuminated with the second illumination light IG2.

As shown in the chart (e), the luminance signal of B light is written to the transmission-type liquid-crystal light valve 331 at the beginning of a B frame portion FB provided in the last part. As shown in the chart (f), the transmission-type liquid-crystal light valve 331 is illuminated with the third illumination light IB. Likewise, as shown in the chart (g), the luminance signal of R light is written to the transmission-type liquid-crystal light valve 331 at the beginning of a R frame portion FR provided in the middle. As shown in the chart (h), the transmission-type liquid-crystal light valve 331 is illuminated with the fourth illumination light IR.

During the operations, the drive current of the LEDs 21a and 21b is set to, for example, about twice a rated current, and the light emission intensity of the LEDs 21a and 21b is set to about twice as high as ordinary intensity. However, a light-emission intensity ratio between the LEDs 21a and 21b or an intensity ratio between them with respect to the LEDs 23a and 25a can be changed or adjusted if necessary according to uses.

A projector according to a fifth embodiment is a modification of the projector 10 according to the first embodiment, and a digital mirror device (hereinafter, "DMD", manufactured by Texas Instruments Inc.) is used instead of the transmission-type liquid-crystal light valve. The same reference signs are assigned to those corresponding to the portions in the first embodiment, and explanation thereof is omitted.

Figure 8:
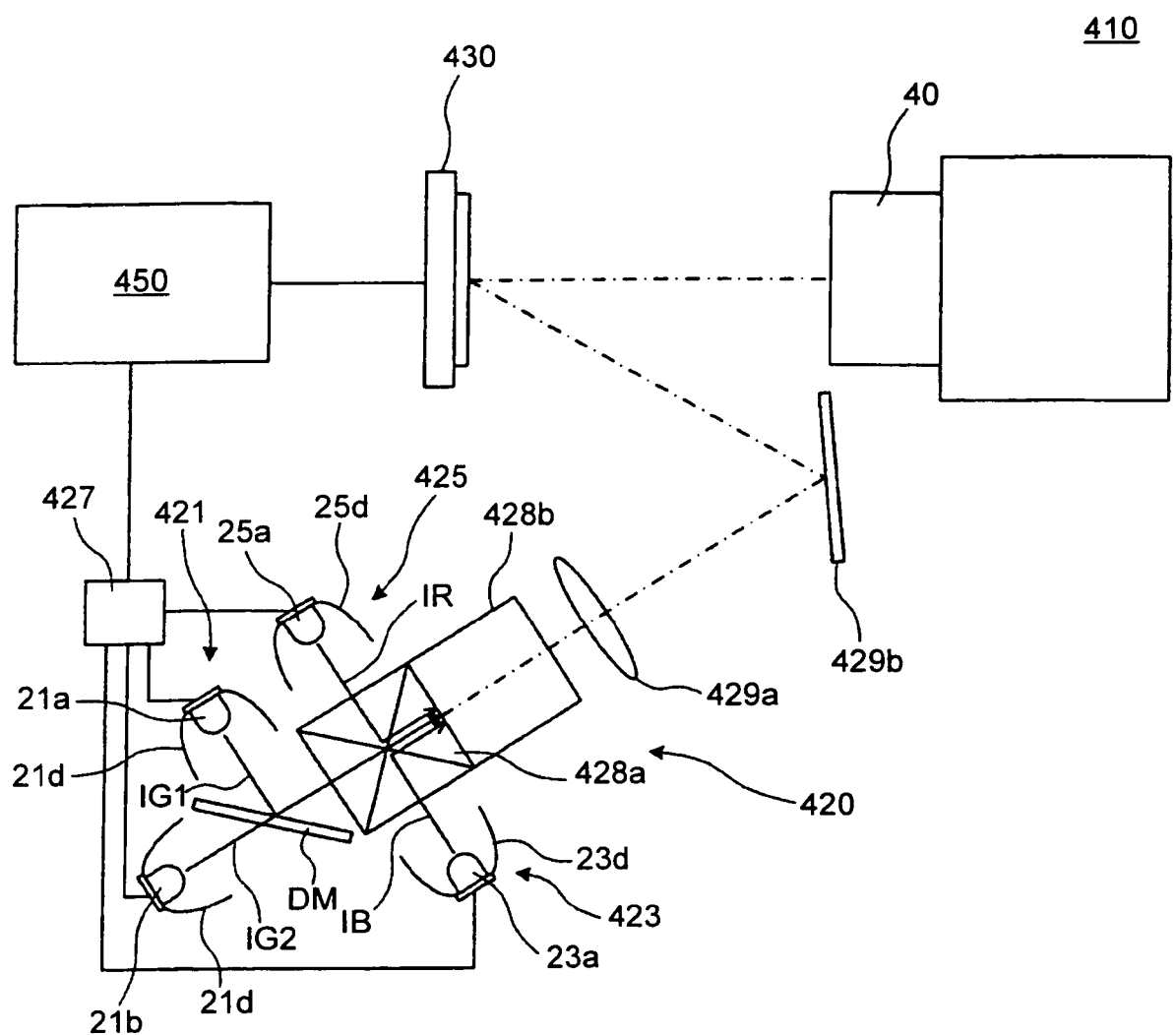
FIG. 8 is a diagram for explaining a structure of a projector according to a fifth embodiment of the present invention.

FIG. 8 is a block diagram for conceptually explaining a structure of a projector 410 according to the fifth embodiment. The projector 410 includes a lighting device 420, a digital mirror device 430 that is the light modulating device and is also referred to as tilt mirror device, the projection lens 40, and a controller 450. The lighting device 420 includes a G-light light source device 421, a B-light light source device 423, a R-light light source device 425, a light-source drive unit 427, a cross dichroic prism 428a, and a rod lens 428b.

In the lighting device 420, the G-light light source device 421 includes the LEDs 21a and 21b that are a pair of first and second light sources, the concave reflecting mirrors 21d that collect the illumination lights IG1 and IG2 from the LEDs 21a and 21b, respectively, and a dichroic mirror DM as the wave combining unit that combines the illumination lights IG1 and IG2 from the LEDs 21a and the LEDs 21b. The first illumination light IG1 from the LED 21a is entirely recovered by the concave reflecting mirror 21d to enter the dichroic mirror DM, and is reflected by the dichroic mirror DM to enter the cross dichroic prism 428a. On the other hand, the second illumination light IG2 from the LED 21b is entirely recovered by the concave reflecting mirror 21d to enter the dichroic mirror DM, and passes through it to enter the cross dichroic prism 428a in a state where the second illumination light IG2 is combined with the first illumination light IG1.

The B-light light source device 423 includes the LED 23a that is the third light source and the concave reflecting mirror 23d. The third illumination light IB from the LED 23a, which is the third light source, is entirely recovered by the concave reflecting mirror 23d to enter the cross dichroic prism 428a.

The R-light light source device 425 includes the LED 25a that is the fourth light source and the concave reflecting mirror 25d. The fourth illumination light IR from the LED 25a, which is the fourth light source, is entirely recovered by the concave reflecting mirror 25d to enter the cross dichroic prism 428a.

The illumination lights IG1, IG2, IB, and IR from the respective light source devices 421, 423, and 425 are combined with one another in the cross dichroic prism 428a, and the illumination lights IG1, IG2, IB, and IR are made uniform in the rod lens 428b.

The combined lights of RGB emitted from the rod lens 428b evenly illuminate the DMD 430 through a lens 429a and a mirror 529b. In this case, by adjusting the position and the focal length of the lens 429a, the DMD 430 can be evenly illuminated.

The DMD 430 has a known structure, and includes a large number of micromirrors that are arranged in a two-dimensional matrix to form pixels, actuators that discretely adjust postures of the micromirrors, and a control circuit that controls the operation of the actuators, which are integrally formed on a substrate. By inputting an appropriate image signal into the DMD 430, controls can be performed so as to allow the light reflected from a micromirror corresponding to each pixel to enter a pupil of the projection lens 40 (ON state) or not to enter it (OFF state). The projection lens 40 then projects an image corresponding to the image signal input into the DMD 430 onto a screen (not shown).

Figure 9:
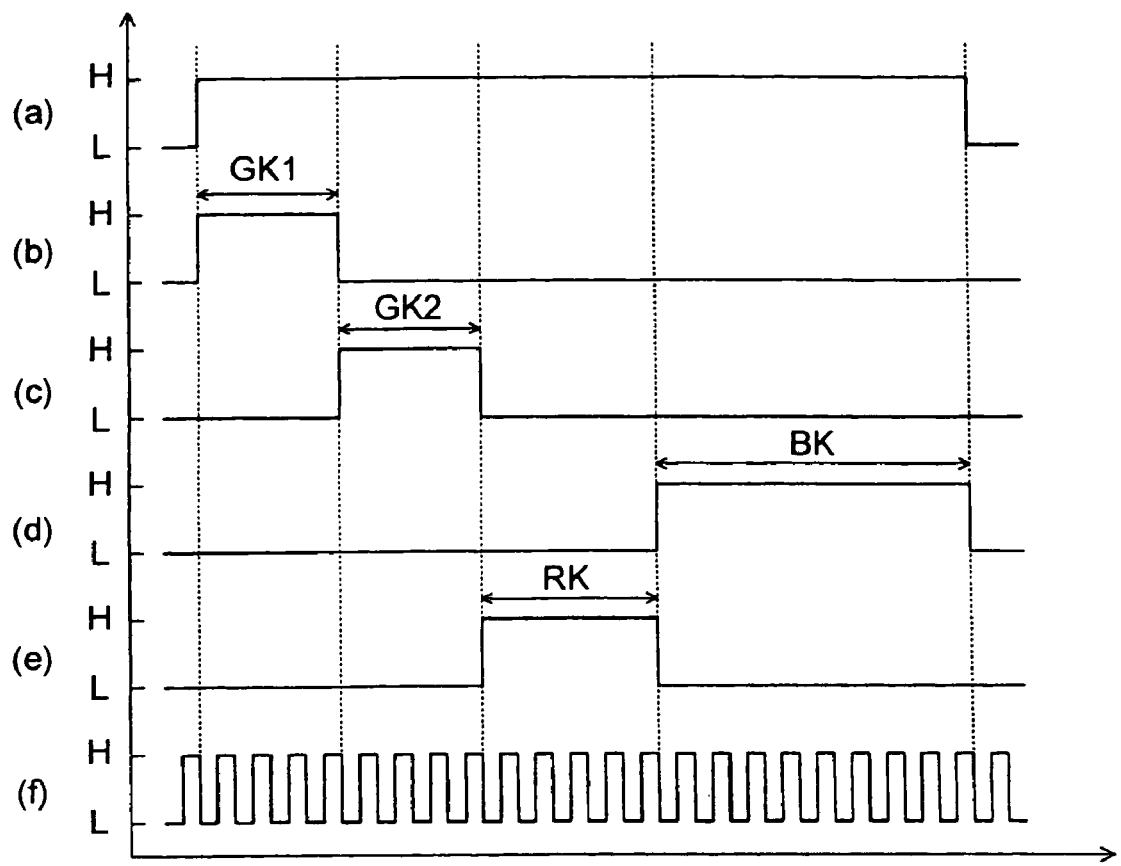
FIG. 9 is a diagram for explaining operation of the projector according to the fifth embodiment.

FIG. 9 is a diagram for explaining operation of one frame in the projector 410 according to the fifth embodiment. Charts (b), (c), (d), and (e) of FIG. 9 represent signals for expressing gradation of colored lights in one frame period indicated in a chart (a). A chart (f) of FIG. 9 represents a clock signal. A signal for expressing G1-gradation as shown in the chart (b) corresponds to a period GK1 of expression of the G1-gradation, and the LED 21a (see FIG. 8) is lit during only this period. A signal for expressing G2-gradation as shown in the chart (c) corresponds to a period GK2 of expression of the G2-gradation, and the LED 21b (see FIG. 8) is lit during only this period. A signal for expressing B-gradation as shown in the chart (d) corresponds to a period BK of expression of the B-gradation, and the LED 23a (see FIG. 8) is lit during this period. A signal for expressing R-gradation as shown in the chart (e) corresponds to a period RK of expression of the R-gradation, and the LED 25a (see FIG. 8) is lit during only this period.

Figure 10:
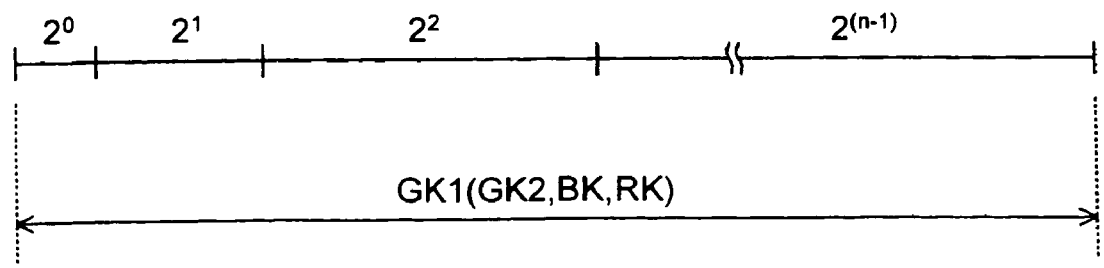
FIG. 10 is a diagram for explaining a time for expressing gradation.

As shown in FIG. 10, the period GK1 of expression of the G1-gradation is divided into n numbers of unit times ($2^0, 2^1, 2^2, \ldots, 2^{(n-1)}$) corresponding to intensities of an n-bit image. For example, if the image signal of a particular pixel of G1 light is a maximum, a micromirror of the DMD 430 is set to an ON state in all the n numbers of unit times, i.e., almost entire period GK1 of expression of the G1-gradation. On the other hand, if the image signal of a particular pixel of G1 light is a minimum, a corresponding micromirror is set to an OFF state in all the n numbers of unit times, i.e., almost entire period GK1 of expression of the G1-gradation. Consequently, the ON-OFF time of the micromirror can be adjusted according to an intensity signal of the G1 light in each pixel during the period GK1 of expression of the G1-gradation. Likewise, the period GK2 of expression of the G2-gradation, the period BK of expression of the B-gradation, and the period RK of expression of the R-gradation are also divided into n numbers of unit times, respectively, and the ON-OFF time of a micromirror is adjusted according to an intensity signal of each pixel.

In this case, proportions among the periods GK1, GK2, BK, and RK of expression of the respective gradations are adjusted as required according to set rated intensities and white levels of the LEDs 21a, 21b, 23a, and 25a.

The projector 410 can reduce the loss of respective illumination lights due to wave combination of the illumination lights IG1, IG2, IB, and IR from the LEDs 21a, 21b, 23a, and 25a. This allows the illumination lights to efficiently enter the DMD 430, and therefore, the luminance of an image to be projected can be enhanced. Furthermore, this allows a color image using four primary colors G1, G2, B, and R to be projected, and therefore, a color reproduction range can be easily widened.

In the embodiments, the G light is divided into the G1 light and the G2 light to perform a color display using the four colors, but at least one of the R light and the B light other than the G light is divided into two lights to perform such a color display. A color display using the four colors or more may be performed.

The projectors have been explained in the embodiments, but the present invention can be also used in a display device such as an LCD without provision of the projection lens 40 that is the projection optical system.

Figure 11:
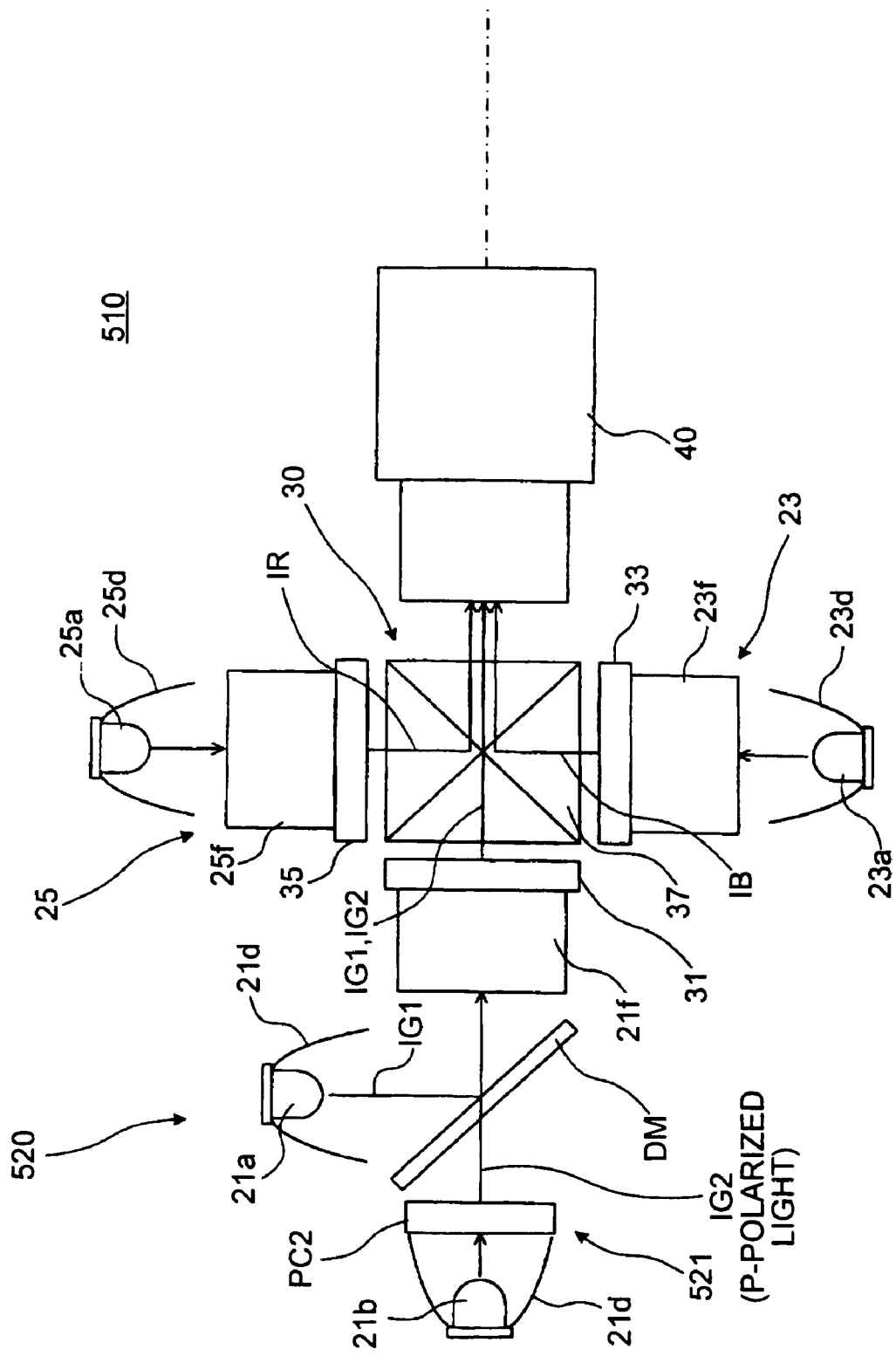
FIG. 11 is a diagram of a structure of a projector according to a sixth embodiment of the present invention.

FIG. 11 is a block diagram for conceptually explaining a structure of a projector 510 according to a sixth embodiment. The same reference signs are assigned to those corresponding to the portions in the first embodiment, and explanation thereof is omitted. In the projector 510, a G-light lighting device 21 of a lighting device 520 includes a polarization converter PC2. The polarization converter PC2 is the polarization converter that converts the illumination light from the LED 21b, which is the second light source, to a predetermined polarized light.

The second illumination light IG2 from the LED 21b is entirely recovered by the concave reflecting mirror 21d to enter the polarization converter PC2. The second illumination light IG2 that has been converted to almost only p-polarized light by the polarization converter PC2 enters the dichroic mirror DM and passes through it where the second illumination light IG2 is combined with the first illumination light IG1, and the combined lights enter the rod lens 21f.

Figure 12:
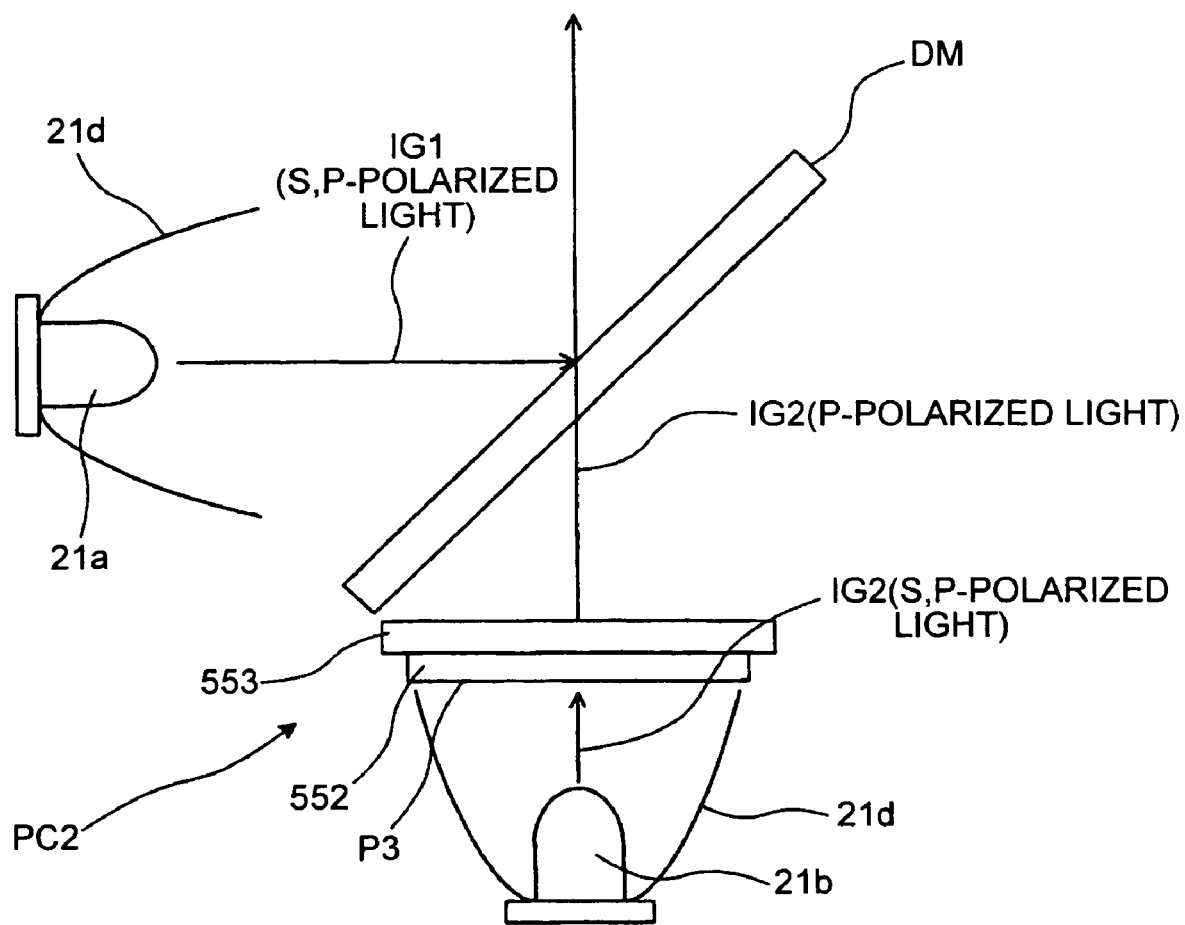
FIG. 12 is a diagram for explaining a structure of a polarization converting element of FIG. 11.

FIG. 12 is a diagram for explaining a structure of the polarization converter PC2. The polarization converter PC2 includes a λ/4 waveplate 552 that changes a polarized state, and a reflection-type polarizing plate 553 that extracts a specifically polarized light component. The reflection-type polarizing plate 553 is the grid-type polarizer the same as the reflection-type polarizing plate 163 (see FIG. 3) according to the second embodiment.

The second illumination light IG2 emitted from the LED 21b in its front direction enters the λ/4 waveplate 552 through one end P3 thereof. The second illumination light IG2 emitted from the LED 21b in its side direction is reflected by the concave reflecting mirror 21d, which is the reflecting unit, to also enter the end P3 of the λ/4 waveplate 52. The light incident from the end P3 then passes through the reflection-type polarizing plate 553. During passage of the second illumination light IG2 through the λ/4 waveplate 552, a linearly polarized light component of the second illumination light IG2 is converted to a circularly polarized light. During passage of the second illumination light IG2 through the reflection-type polarizing plate 553, only the p-polarized light of the second illumination light IG2 selectively passes through it. The second illumination light IG2 reflected by the reflection-type polarizing plate 553 is mainly the s-polarized light, but by passing through the λ/4 waveplate 552, the second illumination light IG2 is converted to the circularly polarized light to be returned to the concave reflecting mirror 21d. The second illumination light IG2 reflected by the concave reflecting mirror 21d enters again the λ/4 waveplate 552 and the reflection-type polarizing plate 553. Such a re-incident light is converted from the circularly polarized light to the p-polarized light by the λ/4 waveplate 552 to efficiently pass through the reflection-type polarizing plate 553. As is clear from the explanation, the second illumination light IG2 incident on the dichroic mirror DM from the reflection-type polarizing plate 553 consists of only the p-polarized light to which the light from the LED 21b has been converted with high efficiency.

The dichroic mirror DM reflects the first illumination light IG1 by almost 100% and passes the second illumination light IG1, which is the p-polarized light, with high efficiency. Therefore, it is possible to reduce the loss of both the illumination lights IG1 and IG2 due to the wave combination of the illumination lights IG1 and IG2 from the LED 21a and the LED 21b. At this time, the wavelengths of the illumination lights IG1 and IG2 are close to each other, which makes it possible to provide the G-light lighting device 521 with high color purity and high intensity. Since both the LEDs 21a and 21b are arranged on the respective optical axes, the characteristics of the illumination lights from the LEDs 21a and 21b are made uniform to allow the illumination lights to enter the G-light transmission-type liquid-crystal light valve 31 (see FIG. 11). Therefore, it is possible to increase the use efficiency of the illumination lights by the G-light transmission-type liquid-crystal light valve 31. The characteristics of the dichroic mirror DM according to the sixth embodiment are the same as those of the dichroic mirror DM according to the second embodiment as explained with reference to FIG. 4.

As explained above, in the projector 510 according to the sixth embodiment, the first and the second illumination lights IG1 and IG2 can be efficiently combined with each other by using the dichroic mirror DM and the polarization converter PC2. Therefore, it is possible to improve the intensity of G light finally obtained by the wave combination while maintaining the color purity thereof.

A projector according to a seventh embodiment is explained below. The structure of the projector is substantially the same as that of the projector 510 according to the sixth embodiment as shown in FIG. 11. The projector according to this embodiment is different from the projector 510 according to the sixth embodiment in a point that the feature of the dichroic mirror DM is to use a low-pass filter. As explained above, since only the feature of the dichroic mirror DM is different, the projector of this embodiment is explained below with reference to the structure of the projector 510 as shown in FIG. 11 as required.

Figure 13:
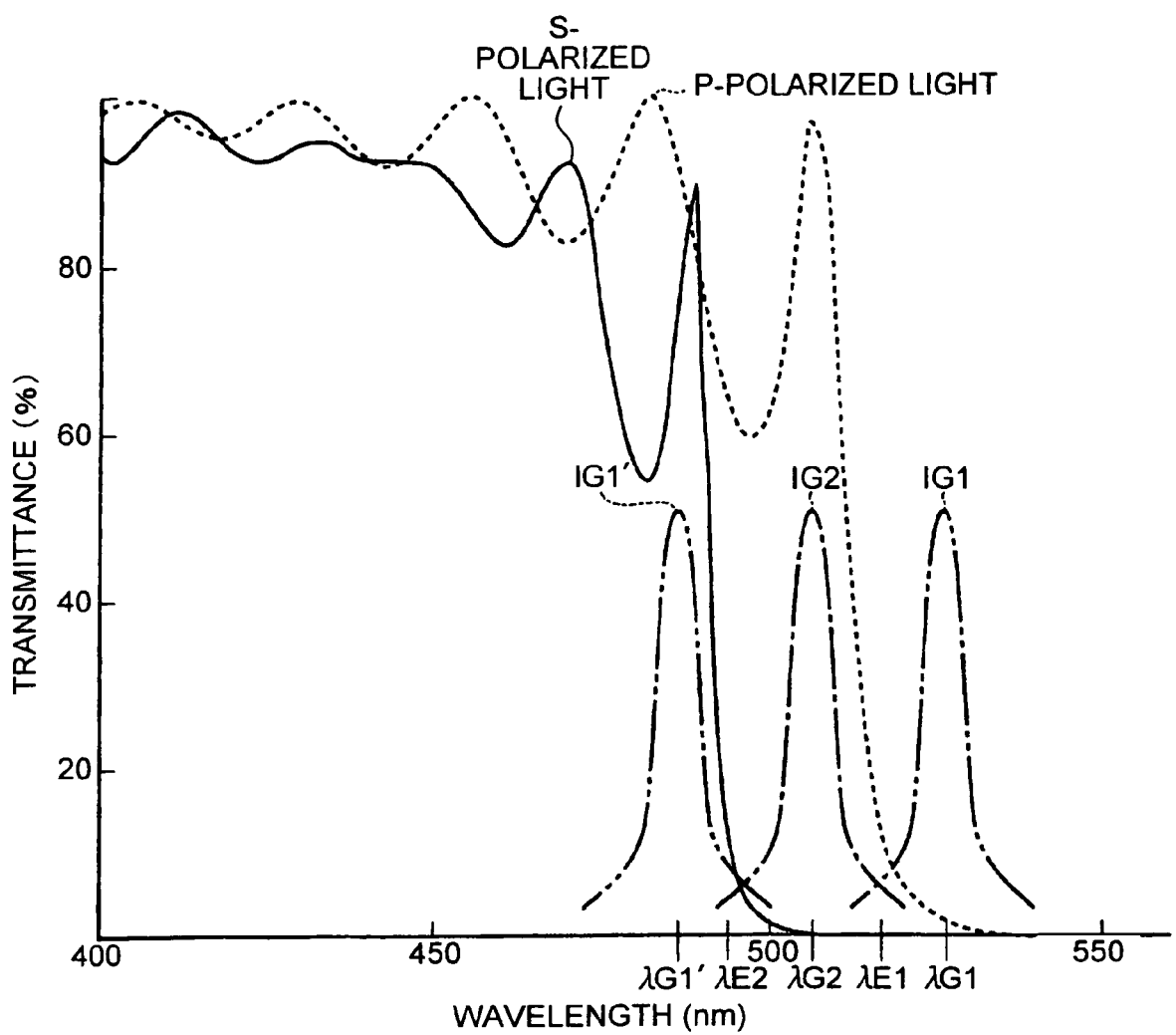
FIG. 13 is a diagram for explaining characteristics of the dichroic mirror.

FIG. 13 is a graph for explaining characteristics of the dichroic mirror DM incorporated in the projector according to the seventh embodiment. The transmittance of the dichroic mirror DM is also polarization-dependent, and the first edge wavelength λE1 (transmittance: 10%) corresponding to a transmission edge of a p-polarized light is about 520 nm while the second edge wavelength λE2 (transmittance: 10%) corresponding to a transmission edge of an s-polarized light is about 490 nm. As shown in the graph, intensity distributions of the first and the second illumination lights IG1 and IG2 from the LEDs 21a and 21b are depicted in a superimposed manner in arbitrary units (y-axis). As is clear from the graph, a central wavelength λG1 of the first illumination light IG1 is set in a longer wavelength side than the first edge wavelength λE1. A central wavelength λG2 of the second illumination light IG2 is set in between the first edge wavelength λE1 and the second edge wavelength λE2. Consequently, the first illumination light IG1 from the LED 21a is reflected by the dichroic mirror DM by almost 100%. On the other hand, the second illumination light IG2 from the LED 21b is converted to a p-polarized light with high efficiency through the polarization converter PC2, and therefore, the p-polarized light passes through the dichroic mirror DM at a high rate.

As explained above, based on the structure such that the first illumination light IG1 is reflected by the dichroic mirror DM and the second illumination light IG2 passes through the dichroic mirror DM, the first and the second illumination lights IG1 and IG2 are combined with each other. Furthermore, in the similar manner to the second embodiment as explained with reference to FIG. 4, and the second illumination light IG2 from the LED 21b may be reflected by the dichroic mirror DM.

Figure 14:
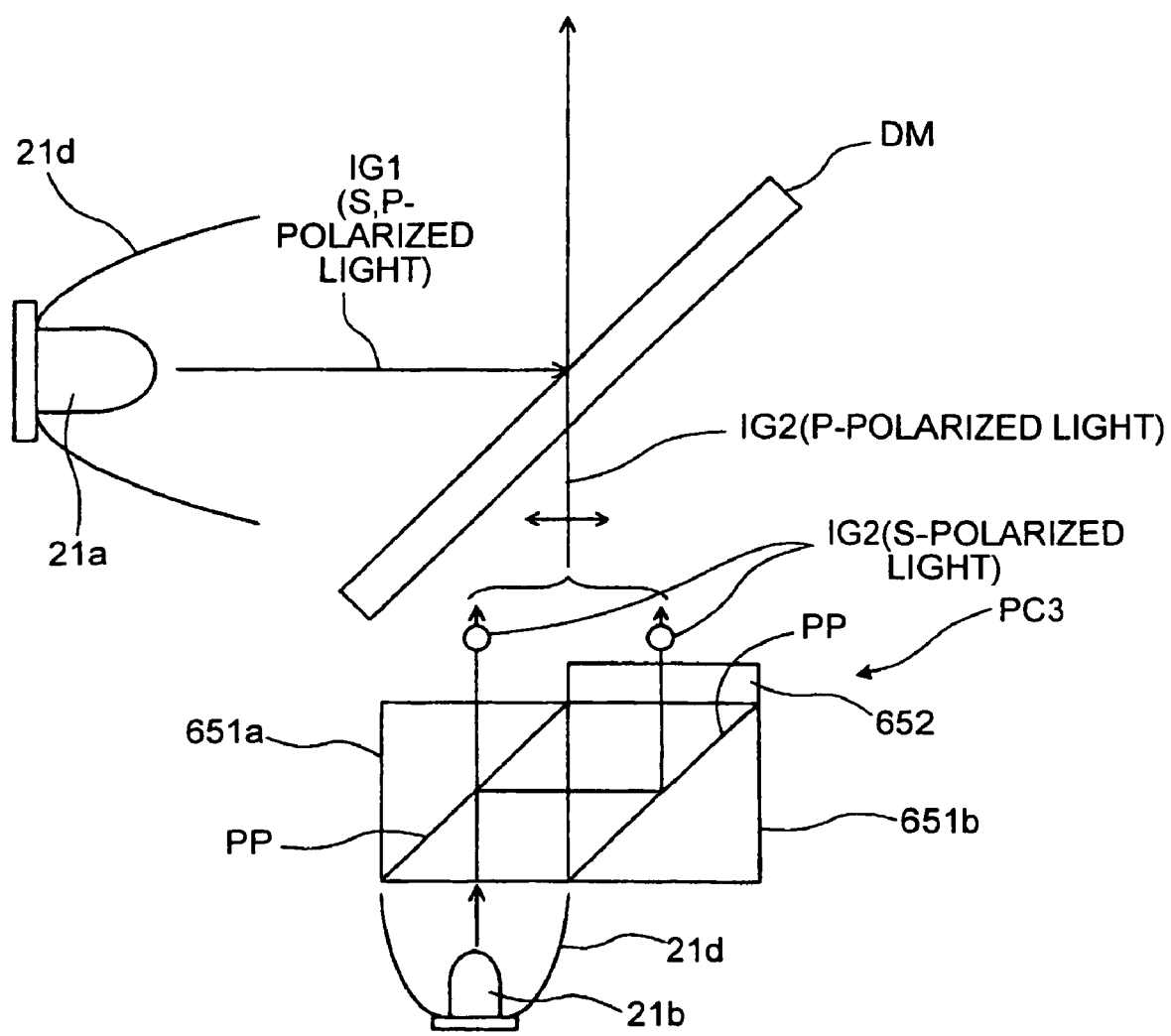
FIG. 14 is a diagram for explaining a structure of a polarization converting element according to an eighth embodiment.

FIG. 14 is a diagram for explaining a structure of a polarization converter PC3 of a projector according to an eighth embodiment. The structure of the projector according to this embodiment is almost the same as that of the projector 510 according to the sixth embodiment as shown in FIG. 11. The projector according to this embodiment has a polarization converter that is different from that of the projector 510 according to the sixth embodiment.

The polarization converter PC3 of the projector according to the eighth embodiment includes a pair of polarization beam splitters 651a and 651b that extracts polarized light components, and a λ/2 waveplate 652 that changes a polarized state. The second illumination light IG2 emitted from the LED 21b in its front direction enters the polarization beam splitter 651a at the front. The second illumination light IG2 emitted from the LED 21b in its side direction is reflected by the concave reflecting mirror 21d to also enter the polarization beam splitter 651a at the front. The second illumination light IG2 incident on the polarization beam splitter 651a passes through a polarizing plane PP to be converted to an s-polarized light. On the other hand, a p-polarized light reflected by the polarizing plane PP is reflected by a polarizing plane PP of the adjacent polarization beam splitter 651b to enter the λ/2 waveplate 652. The p-polarized light incident on the λ/2 waveplate 652 is converted to an s-polarized light. As a result, the second illumination light IG2 emitted from the polarization converter PC3 becomes only the s-polarized light almost perfectly. It is noted that, for simplicity, only the polarization converter PC3 is shown in its state viewed from the side direction in the figure. Therefore, the second illumination light IG2 actually incident on the dichroic mirror DM consists of only the p-polarized light.

As explained above, the second illumination light IG2 incident on the dichroic mirror DM through the polarization converter PC3 consists of only the p-polarized light to which the light from the LED 21b has been efficiently converted. In other words, it is possible to reduce the loss of both the illumination lights IG1 and IG2 due to the wave combination of the illumination lights IG1 and IG2 from the LEDs 21a and 21b. Furthermore, the wavelengths of both the illumination lights IG1 and IG2 are close to each other, which makes it possible to provide a lighting device capable of supplying high-intensity illumination light with high color purity.

Figure 15A:
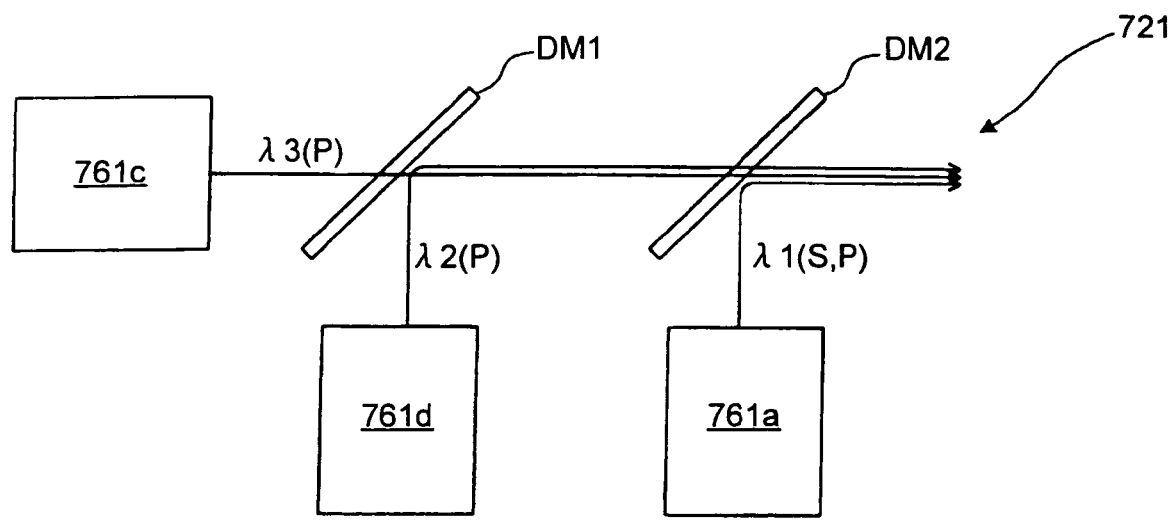
FIG. 15A and FIG. 15B are diagrams for explaining a structure of a lighting device according to a ninth embodiment.
Figure 15B:
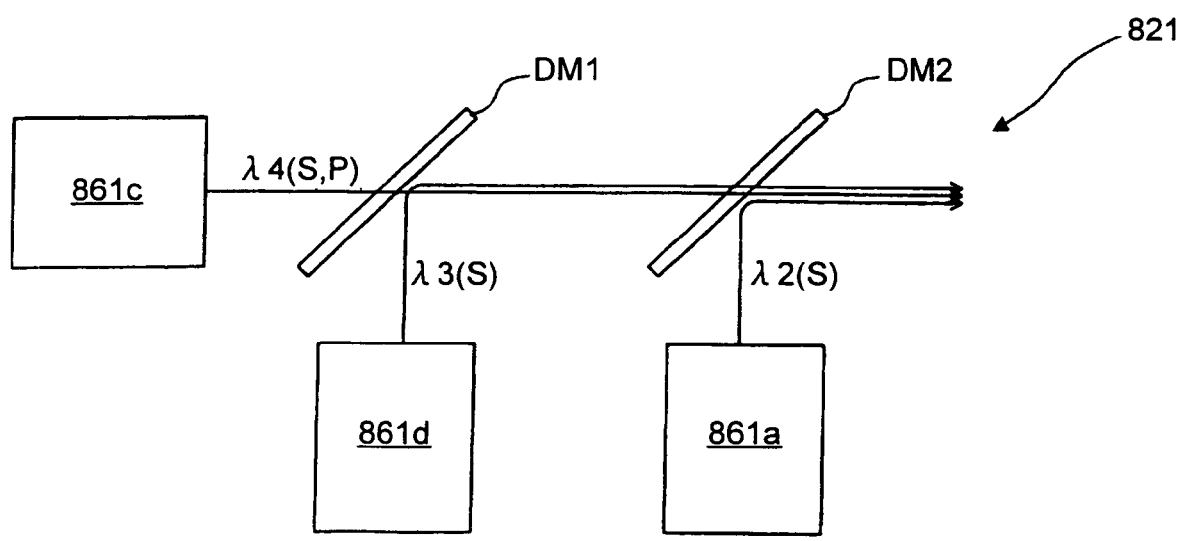

FIG. 15A is a block diagram of a G-light lighting device 721 as a first example of a structure according to a ninth embodiment. FIG. 15B is a block diagram of a G-light lighting device 821 as a second example of the structure according to the ninth embodiment. Both the G-light lighting devices 721 and 821 can be used in the projector 510 according to the sixth embodiment. The G-light lighting devices 721 and 821 respectively include three light sources whose central wavelengths are different from one another, and illumination lights from the three light sources are combined with one another in a pair of dichroic mirrors.

The G-light lighting device 721 as shown in FIG. 15A allows an illumination light with its central wavelength $\lambda 1$ to be reflected by a dichroic mirror DM2. This illumination light is emitted from a light source device 261a which includes the LED and the concave reflecting mirror. The G-light lighting device 721 also allows an illumination light with its central wavelength $\lambda 2$ to be reflected by a dichroic mirror DM1 and pass the illumination light through the dichroic mirror DM2. This illumination light is emitted from a light source device 761b which, although it has the similar structure, further includes the polarization converting element that converts the light to a p-polarized light. Furthermore, the G-light lighting device 721 allows an illumination light with its central wavelength $\lambda 3$ to pass through the dichroic mirror DM1 and the dichroic mirror DM2. This illumination light is emitted from a light source device 761c which further includes the polarization converting element that converts the light to a p-polarized light. As explained above, the illumination light emitted from the dichroic mirror DM2 has high intensity as a result of combining the illumination lights from the light source devices 761a, 761b, and 761c. It is noted that the pair of dichroic mirrors DM1 and DM2 have reflectance and transmittance characteristics, explained below, which allows the illumination lights with their central wavelengths $\lambda 1$, $\lambda 2$, and $\lambda 3$ to be combined with one another.

FIG. 16 is a graph for explaining the transmittance characteristic of the dichroic mirrors DM1 and DM2. As is apparent from the graph, both the dichroic mirrors DM1 and DM2 are high-pass filters, and the edge wavelengths of the dichroic mirror DM1 are longer than the edge wavelengths of the dichroic mirror DM2. In both the dichroic mirrors DM1 and DM2, the edge wavelengths of the p-polarized lights indicated by dotted lines shift to the shorter wavelength side than the edge wavelengths of the s-polarized lights indicated by the solid lines. The central wavelength $\lambda 1$ of the illumination light from the light source device 761a is set in the shorter wavelength side than the edge wavelength of the p-polarized light of the dichroic mirror DM2. The central wavelength $\lambda 2$ of the illumination light from the light source device 761b is set in between the edge wavelengths of the p-polarized light and the s-polarized light of the dichroic mirror DM2 and in the shorter wavelength side than the edge wavelength of the p-polarized light from the dichroic mirror DM1. Furthermore, the central wavelength $\lambda 3$ of the illumination light from the light source device 761c is set in between the edge wavelengths of the p-polarized light and the s-polarized light of the dichroic mirror DM1 and in the longer wavelength side than the edge wavelength of the s-polarized light of the dichroic mirror DM2.

The G-light lighting device 821 as shown in FIG. 15B allows an illumination light of the s-polarized light with its central wavelength $\lambda 2$ to be reflected by the dichroic mirror DM2. This illumination light is emitted from a light source device 861a that includes the LED light source, the concave reflecting mirror, and the polarization converting element. The G-light lighting device 821 allows an illumination light as the s-polarized light with its central wavelength $\lambda 3$ to be reflected by the dichroic mirror DM1 and pass through the dichroic mirror DM2. This illumination light is emitted from a light source device 861b that has the same structure as explained above. The G-light lighting device 821 allows an illumination light with its central wavelength $\lambda 4$ to pass through the dichroic mirror DM1 and the dichroic mirror DM2. This illumination light is emitted from a light source device 861c that does not include the polarization converting element. As explained above, the illumination light emitted from the dichroic mirror DM2 has high intensity as a result of combining the illumination lights from the light source devices 861a, 861b, and 861c. It is noted that the pair of dichroic mirrors DM1 and DM2 have the reflectance and transmittance characteristics as shown in FIG. 16. Particularly, the central wavelength $\lambda 4$ of the illumination light from the light source device 861c is set in the longer wavelength side than the edge wavelength of the s-polarized light of the dichroic mirror DM1.

As explained above, the G-light lighting devices 721 and 821 according to the ninth embodiment can coaxially combine the illumination lights from the three different light source devices 761a, 761b, and 761c with one another, and the illumination lights from the different light source devices 861a, 861b, and 861c with one another, respectively. Thus, it is possible to provide the high-intensity lighting device.

Figure 17:
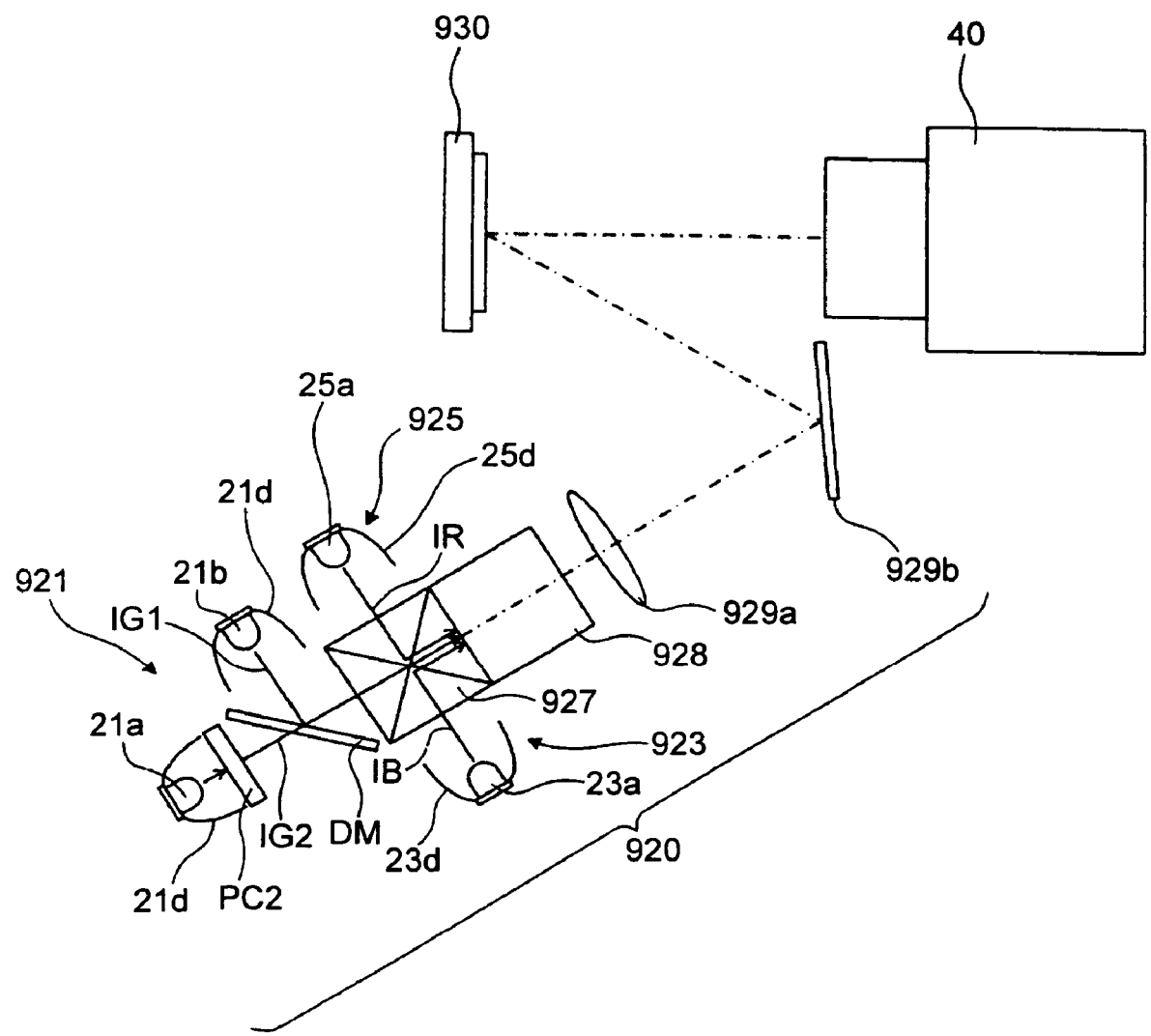
FIG. 17 is a diagram of a structure of a projector according to a tenth embodiment of the present invention.

FIG. 17 is a block diagram of a projector 910 according to a tenth embodiment. The same reference signs are assigned to those corresponding to the portions in the first embodiment, and explanation thereof is omitted. The projector 910 according to this embodiment is a modification of the projector 510 according to the sixth embodiment, in which DMD is used instead of the transmission-type liquid-crystal light valve.

The projector 910 according to this embodiment includes a lighting device 920, a DMD 930 that is the light modulating device, and the projection lens 40. The lighting device 920 includes a G-light light source device 921, a B-light light source device 923, a R-light light source device 925, a cross dichroic prism 927, and a rod lens 928.

In the lighting device 420, the G-light light source device 921 includes the LED 21a that is the first light source and the LED 21b that is the second light source, which emit a pair of illumination lights whose central wavelengths are approximate to each other, the concave reflecting mirrors 21d that collect the illumination lights emitted from the LEDs 21a and 21b, the dichroic mirror DM as the wave combining unit that combines the illumination lights from both the LEDs 21a and 21b, and the polarization converter PC2 as the polarization converter that converts the illumination light from the LED 21a to a predetermined polarized light. The first illumination light IG1 from the LED 21a is entirely recovered by the concave reflecting mirror 21*d* to enter the dichroic mirror DM, and is reflected thereby to enter the cross dichroic prism 427. On the other hand, the second illumination light IG2 from the second light source 21*b* is entirely recovered by the concave reflecting mirror 21*d* to enter the polarization converter PC. The second illumination light IG2 having been converted to almost p-polarized light by the polarization converter PC enters the dichroic mirror DM and passes through it, and the first illumination light IG1 and IG2 enter the cross dichroic prism 427 in a state where they are combined.

The B-light light source device 923 includes the LED 23*a* that is the third light source and the concave reflecting mirror 23*d*. The third illumination light IB from the LED 23*a* is entirely recovered by the concave reflecting mirror 23*d* to enter the cross dichroic prism 427.

The R-light light source device 925 includes the LED 25*a* that is the fourth light source and the concave reflecting mirror 25*d*. The fourth illumination light IR from the fourth light source 25*a* is entirely recovered by the concave reflecting mirror 25*d* to enter the cross dichroic prism 427.

The cross dichroic prism 927 combines the illumination lights IG1, IG2, IB, and IR from the light source devices 921, 923, and 925. The rod lens 928 makes the illumination lights IG1, IG2, IB, and IR substantially uniform.

Combined lights of RGB emitted from the rod lens 928 are evenly projected onto the DMD 930 through a lens 929*a* and a mirror 929*b*. In this case, by adjusting the position and the focal length of the lens 929*a* as required, the DMD 430 can be evenly illuminated.

Figure 18:
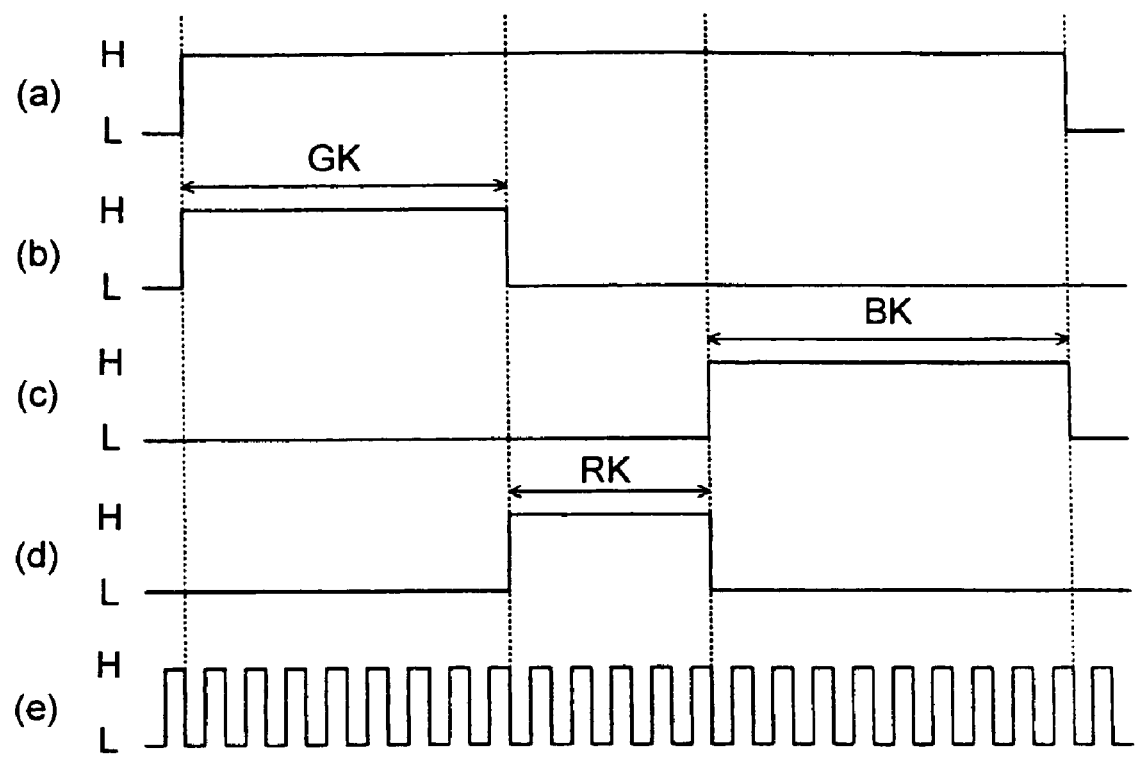
FIG. 18 is a diagram for explaining operation of the projector according to the tenth embodiment.

FIG. 18 is a diagram for explaining the operation of one frame in the projector 910 according to the tenth embodiment. Charts (b), (c), and (d) of FIG. 18 represent signals for expressing gradation of colored lights in one frame period indicated in a chart (a). A chart (e) of FIG. 18 represents a clock signal. The operation of the projector 910 according to the tenth embodiment is the same as that of the fifth embodiment as shown in FIG. 9 except for a point such that a single signal for expressing gradation for G light corresponds to a singularly provided period GK of expression of the G-gradation. As shown in the chart (b), a signal for expressing G-gradation causes the LEDs 21*a* and 21*b* as shown in FIG. 17 to keep on lighting up during the period GK of expression of the G-gradation.

The projector 910 can reduce the loss of the illumination lights IG1 and IG2 due to the wave combination of the illumination lights IG1 and IG2 from both the LEDs 21*a* and 21*b*. This allows the illumination lights with less loss to enter the DMD 930, which makes it possible to enhance the luminance of an image to be projected. Furthermore, the periods GK, BK, and RK where gradations for colored lights are expressed are made about the same as one another, which allows the DMD 930 to be controlled in a simple and well-balanced manner.

The dichroic mirror DM in the projector 910 according to the tenth embodiment is not necessarily the high-pass filter but may be a low-pass filter. Furthermore, the dichroic mirror DM is not necessarily configured to reflect the first illumination light IG1 thereby and pass the second illumination light IG2 therethrough to combine both of them, but may be configured to pass the first illumination light IG1 therethrough and reflect the second illumination light IG2 thereby to combine both of them.

Figure 19:
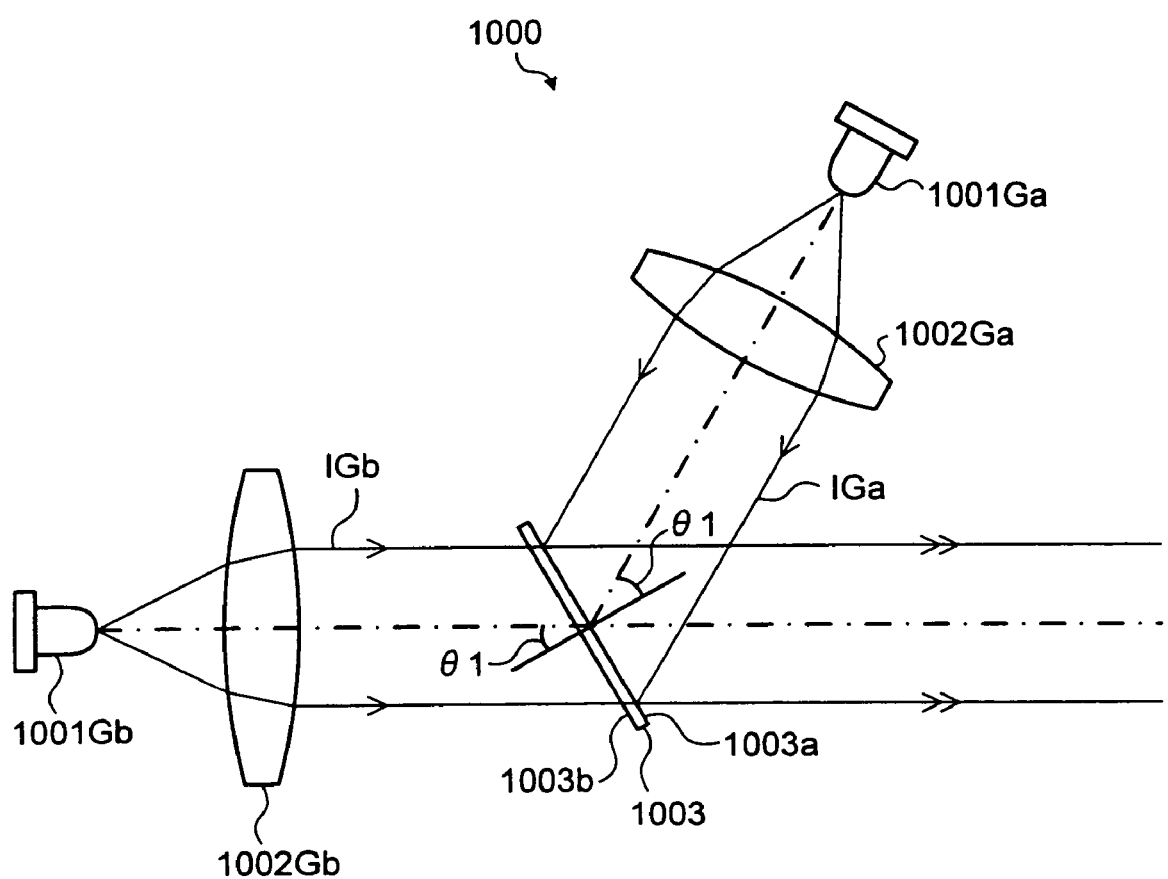
FIG. 19 is a schematic diagram of a lighting device according to an eleventh embodiment.

FIG. 19 depicts a schematic structure of a lighting device 1000 according to an eleventh embodiment of the present invention. An LED 1001Ga that is the first light source supplies a first illumination light IGa that is a non-polarized light. An LED 1001Gb that is the second light source supplies a second illumination light IGb that is a non-polarized light having a wavelength range different from that of the first illumination light. The first light source and the second light source are not necessarily LEDs, and therefore, a solid-state light emitting element, for example, an EL element and an LD element may be used. In the eleventh embodiment, both the first illumination light IGa and the second illumination light IGb are lights having a G-light wavelength range as explained later. The lighting device 1000 supplies a high-intensity G light with high color purity.

A dichroic mirror 1003, which is the wave combining unit, combines the first illumination light IGa and the second illumination light IGb that are traveling from different directions, and emits the illumination lights combined. The dichroic mirror 1003 includes a first plane 1003*a* and a second plane 1003*b* that is different from the first plane 1003*a*. The first plane 1003*a* has a dielectric multilayer film (not shown) formed thereon. The first illumination light IGa emitted from the LED 1001Ga is converted to substantially collimated light by a collimator lens 1002Ga. The first illumination light IGa as the substantially collimated light enters the first plane 1003*a* of the dichroic mirror 1003 at an angle $\theta_1$ of incidence. The second illumination light IGb as substantially collimated light enters the second plane 1003*b* of the dichroic mirror 1003 at the angle $\theta_1$ of incidence. The angle $\theta_1$ of incidence is less than 45°. In the eleventh embodiment, the angle $\theta_1$ of incidence is 25°.

As explained above, the angle $\theta_1$ of the first illumination light IGa incident on the dichroic mirror 1003 is the same as the angle $\theta_1$ of the second illumination light IGb incident on the dichroic mirror 1003. The first illumination light IGa enters the dichroic mirror 1003 from the first plane 1003*a* side. The second illumination light IGb enters it from the second plane 1003*b* side that is different from the first plane 1003*a*. The dichroic mirror 1003 reflects the first illumination light IGa incident from the first plane 1003*a* side to emit it toward a predetermined direction. The dichroic mirror 1003 passes the second illumination light IGb incident from the second plane 1003*b* side to emit it toward the predetermined direction. Therefore, the dichroic mirror 1003 can combine the first illumination light IGa and the second illumination light IGb to be output toward the identical direction. As explained above, the angles $\theta_1$ of the illumination lights incident on the dichroic mirror 1003 from the different directions can be set to the same as each other. Here, the angle $\theta_1$ of incidence indicates an angle between a normal line of an incident plane and an incident ray. Therefore, the first illumination light IGa reflected by the first plane 1003*a* of the dichroic mirror 1003 and the second illumination light IGb passing through the second plane 1003*b* are combined in the same direction to be output. Thus, it is possible to accurately combine the two illumination lights IGa and IGb.

As explained above, the angle $\theta_1$ of the first illumination light IGa incident on the dichroic mirror 1003 and the angle $\theta_1$ of the second illumination light IGb incident on the dichroic mirror 1003 are set to less than 45°, for example, 25° in the eleventh embodiment. The transmittance characteristic of the dichroic mirror 1003 in the eleventh embodiment is explained below by comparing it with the transmittance characteristic based on the conventional technology.

Figure 20A:
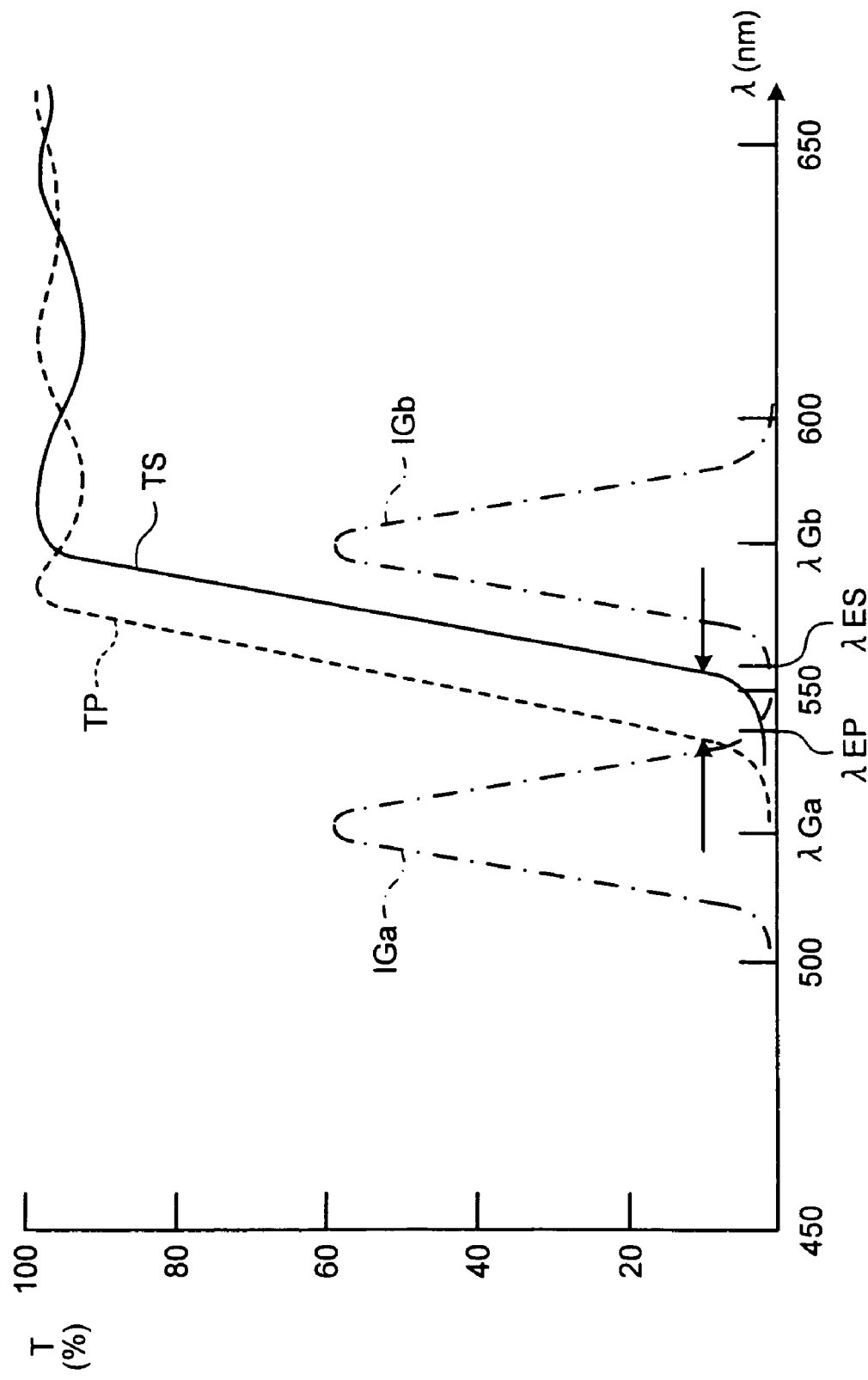
FIG. 20A is an optical characteristic diagram of the dichroic mirror for the lighting device according to the present invention.

FIG. 20A depicts the transmittance characteristic of the dichroic mirror 1003. As shown in FIG. 20A, the x-axis plots wavelength λ (nm) and the y-axis plots transmittance T (%). The dichroic mirror 1003 functions as a high-pass filter. A dichroic plane formed with the dielectric multilayer film (not shown) has the transmittance T that is polarization-dependent. As shown in FIG. 20A, a transmittance characteristic curve TS of an s-polarized light indicated by the solid line and a transmittance characteristic curve TP of a p-polarized light indicated by the broken line have different characteristics from each other. The first edge wavelength λEP (T=10%) corresponds to a transmission edge of the transmittance characteristic curve TP. The second edge wavelength λES (T=10%) corresponds to a transmission edge of the transmittance characteristic curve TS. In the eleventh embodiment, a difference between the first edge wavelength λEP and the second edge wavelength λES is about 10 nm. Intensity distributions of the first and the second illumination lights IGa and IGb are depicted in FIG. 20A in a superimposed manner in arbitrary units (y-axis). In this embodiment, the difference between the first edge wavelength λEP and the second edge wavelength λES can be reduced as compared with that of the conventional technology explained later. Therefore, a peak wavelength λGa of the first illumination light IGa and a peak wavelength λGb of the second illumination light IGb can be made close to each other.

FIG. 20B depicts the transmittance characteristic of the dichroic mirror and intensity distributions of illumination lights based on the conventional technology in the same manner as that of FIG. 20A. Conventional transmittance characteristic curves TS and TP shift to a shorter wavelength side by about 25 nm as compared with the transmittance characteristic according to the eleventh embodiment. The difference between the first edge wavelength λEP and the second edge wavelength λES is larger than that of this embodiment, that is, about 20 nm or more. In the conventional technology, in order to reflect all the first illumination light IGx on the dichroic mirror, a peak wavelength λGx thereof has to be set to about 510 nm or less. Furthermore, in order to pass all the second illumination light IGy through the dichroic mirror, a peak wavelength λGy thereof has to be set to about 540 nm or more. As explained above, in the conventional structure, the peak wavelengths λGx and λGy of the two illumination lights are apart from each other, which causes color purity to be reduced.

If the angle θ1 of the light incident on the dichroic mirror 1003 is about zero, i.e., vertical incidence, the transmittance characteristic or the reflectance characteristic is not affected by a polarized state of the p-polarized light or the s-polarized light. Therefore, the vertical incidence allows the transmittance characteristic or the reflectance characteristic to less undergo the polarized state of an incident light. As is clear from this, the influence of the polarization-dependence over the transmittance characteristic or the reflectance characteristic of the dichroic mirror 1003 is reduced as the incident angle of light is made closer to a vertical direction, i.e., a direction of about zero. As a result, by setting the incident angle θ1 to less than 45°, the difference between the first edge wavelength λEP of the p-polarized light and the second edge wavelength λES of the s-polarized light in the dichroic mirror 1003 can be reduced. This allows the peak wavelength λGa of the first illumination light IGa and the peak wavelength λGb of the second illumination light IGb to be close to each other. Therefore, the two illumination lights whose peak wavelengths are close to each other are accurately combined to be output, which makes it possible to supply high-intensity illumination light with high color purity.

Figure 21:
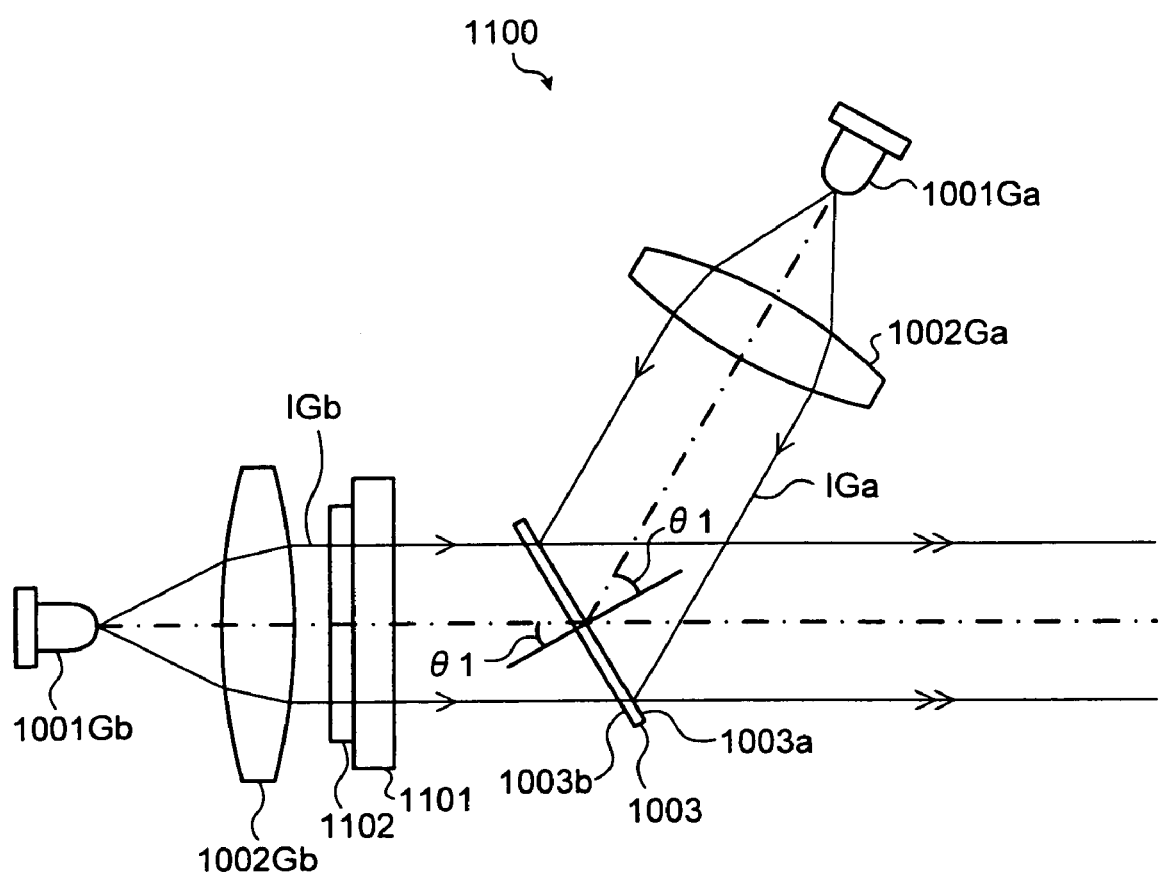
FIG. 21 is a schematic diagram of a lighting device according to a twelfth embodiment of the present invention.

FIG. 21 depicts a schematic structure of a lighting device 1100 according to a twelfth embodiment of the present invention. In the eleventh embodiment, both the first illumination light IGa and the second illumination light IGb are non-polarized lights. On the other hand, this embodiment is different from the eleventh embodiment in a point such that the second illumination light IGb is linearly polarized in a particular direction of vibration. The same reference signs are assigned to the rest of the structure corresponding to the portions of the eleventh embodiment, and explanation thereof is omitted.

The second illumination light IGb from the LED 1001Gb is a non-polarized light, and is converted to substantially collimated light in a collimator lens 1002Gb as explained above. The second illumination light IGb having been converted to collimated light passes through a λ/4 waveplate 1102 to enter a reflection-type polarizer 1101. The λ/4 waveplate 1102 has a function of converting a polarized state of an incident light to a state as explained later. The reflection-type polarizer 1101 can extract a polarized light component in the particular direction of vibration, for example, a p-polarized light component. As the reflection-type polarizer 1101, the grid-type polarizer can be used in the same manner as the second embodiment. The reflection-type polarizer 1101 passes the p-polarized light component, of the second illumination light IGb that is the non-polarized light, to output it, and reflects the s-polarized light component. The s-polarized light component reflected by the reflection-type polarizer 1101 passes through the λ/4 waveplate 202 again to be converted to a circularly polarized light.

The second illumination light IGb having been converted to the circularly polarized light returns toward the LED 1001Gb. It is further reflected by a reflecting unit (not shown) such as a metal electrode formed on a chip of the LED 1001Gb toward the collimator lens 1002Gb. This reflection causes the direction of turning of the circularly polarized light component to be reversed. The circularly polarized light component turning in the reverse direction again passes through the λ/4 waveplate 1102 where it is converted to a p-polarized light. The reflection-type polarizer 1101 passes the p-polarized light component to be output toward the dichroic mirror 1003. Based on this, the reflection-type polarizer 1101 converts the second illumination light IGb to the p-polarized light and outputs the p-polarized light converted.

Figure 22:
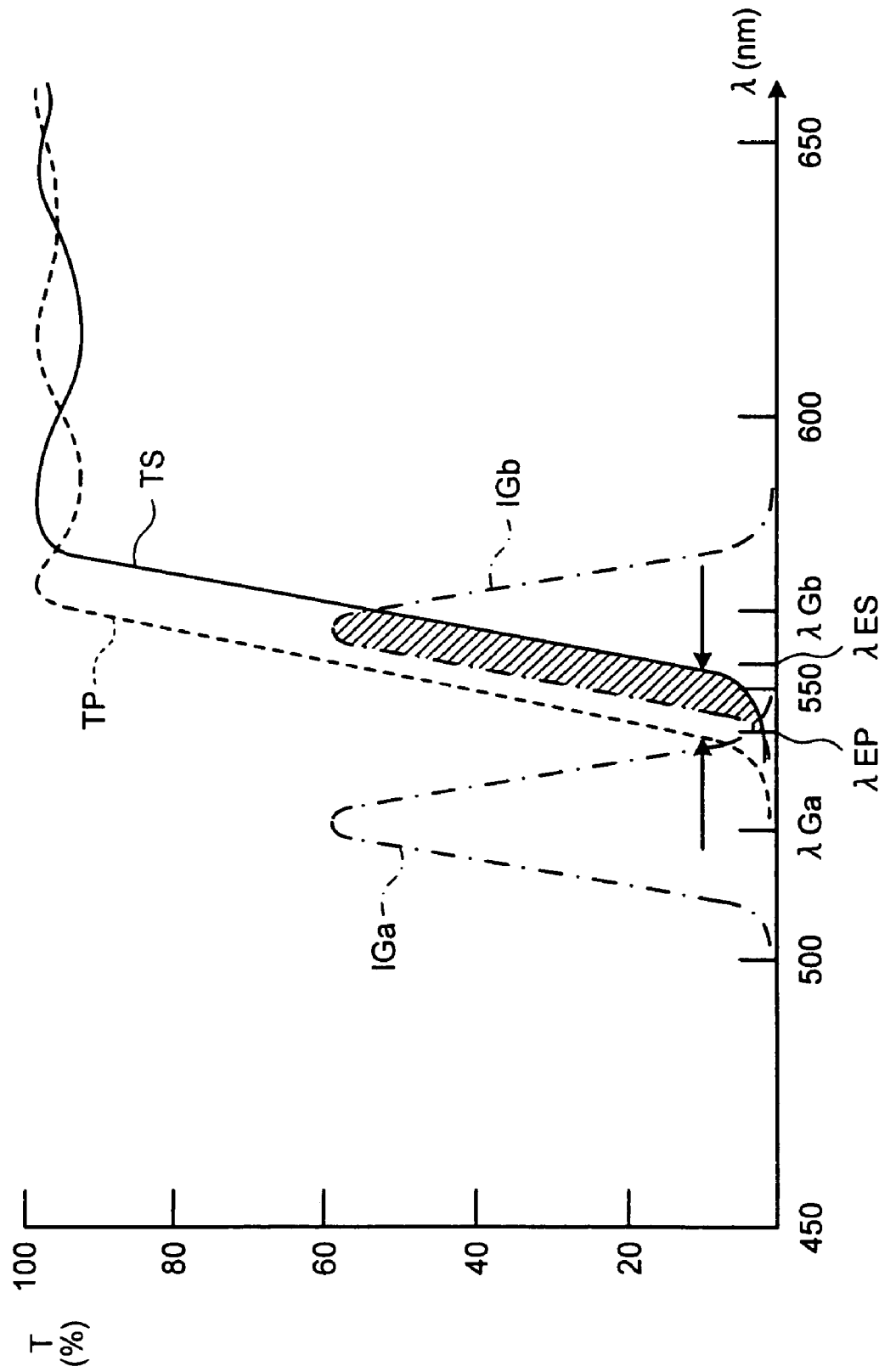
FIG. 22 is an optical characteristic diagram of a dichroic mirror according to the twelfth embodiment.

FIG. 22 depicts the transmittance characteristic of the dichroic mirror 1003 and intensity distributions of illumination lights in the same manner as that of FIG. 20A. The transmittance characteristic of the dichroic mirror 1003 according to the twelfth embodiment is substantially the same as the transmittance characteristic according to the eleventh embodiment. In the twelfth embodiment, the peak wavelength λGb of the second illumination light IGb from the LED 1001Gb is set in a shorter wavelength side as compared with that of the eleventh embodiment. Therefore, a part of a wavelength range of the second illumination light IGb and a wavelength range between the first edge wavelength λEP and the second edge wavelength λES overlap each other. The overlapping wavelength component is shown as a shaded portion in FIG. 22. As for the transmittance characteristic as shown in FIG. 22, if the second illumination light IGb is the non-polarized light as is in the eleventh embodiment, then the dichroic mirror 1003 reflects an s-polarized light component of the component shaded. Because of this, although the dichroic mirror 1003 is desired to pass all the second illumination light IGb, the loss of light amount occurs caused by the reflection of the second illumination light IGb.

In the twelfth embodiment, the dichroic mirror 1003, which is the wave combining unit, is the light combining element using transmitting action and reflecting action of the light. In the dichroic mirror 1003, the first edge wavelength λEP upon transmission of a linearly polarized light in the predetermined direction of vibration, for example, the p-polarized light is different from the second edge wavelength λES upon transmission of a linearly polarized light in a direction of vibration perpendicular to the predetermined direction of vibration, for example, the s-polarized light. Furthermore, as explained above, the reflection-type polarizer 1101, which is the polarization converter, converts such a second illumination light IGb as explained below to the p-polarized light in the predetermined direction of vibration. That is, the second illumination light IGb has such a wavelength range that at least a part of the wavelength range overlaps a wavelength range between the first edge wavelength λEP and the second edge wavelength λES. Thus, the dichroic mirror 1003 can pass the second illumination light IGb without the loss of light amount due to reflection. The dichroic mirror 1003 reflects the first illumination light IGa from the LED 1001Ga in the same manner as that of the eleventh embodiment. The peak wavelengths λEP and λES of the two illumination lights IGa and IGb can be made further closer to each other as compared with the eleventh embodiment. An angle θ1 of the first illumination light IGa incident on the dichroic mirror 1003 and an angle θ1 of the second illumination light IGb incident on the dichroic mirror 1003 are the same as each other. The angle θ1 of incidence is 25°. This allows the loss of light amount of the illumination light to be reduced and the high-intensity illumination light with further higher color purity to be obtained in the lighting device 1100.

Figure 23:
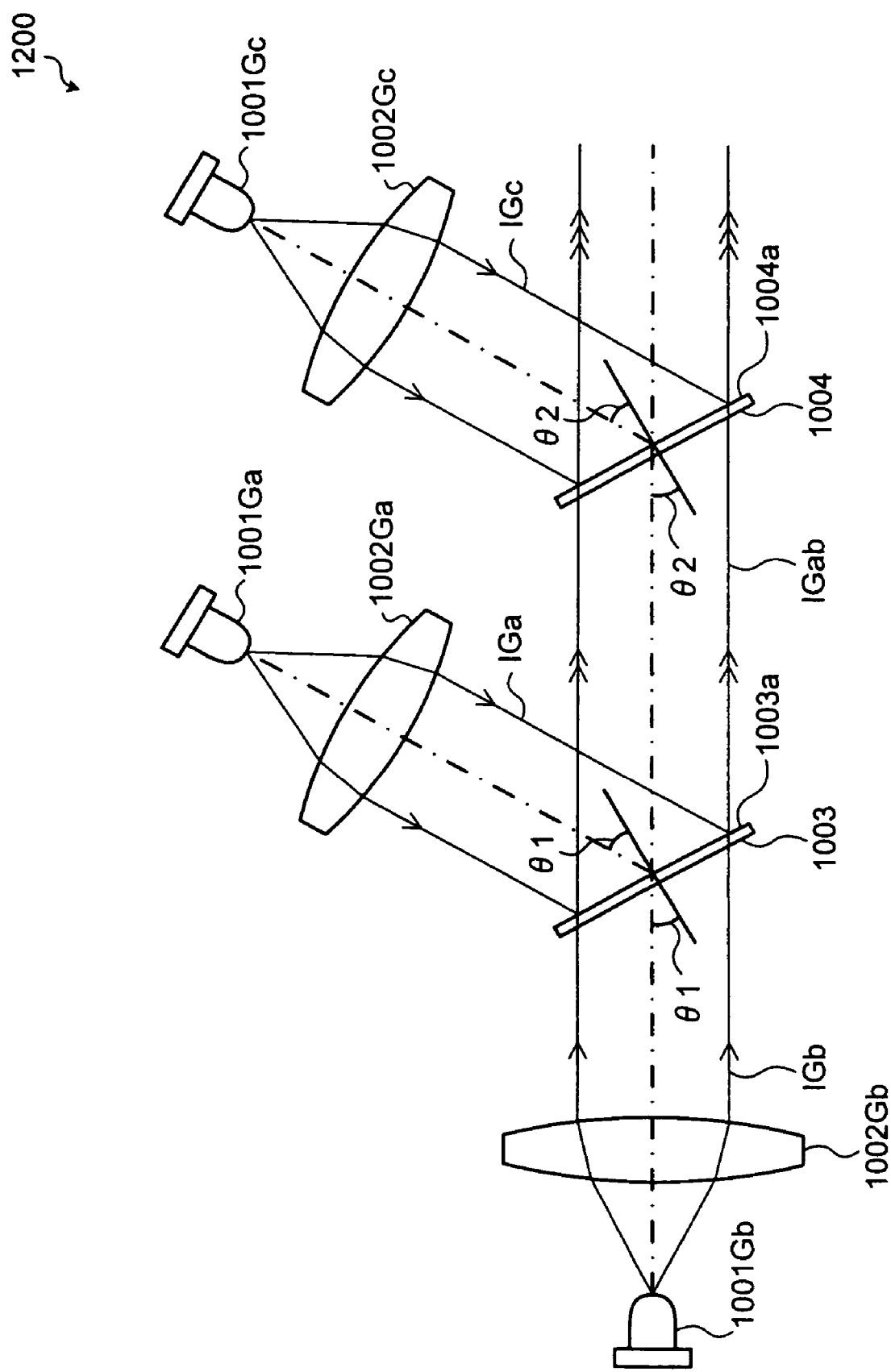
FIG. 23 is a schematic diagram of a lighting device according to a thirteenth embodiment of the present invention.

FIG. 23 depicts a schematic structure of a lighting device 1200 according to a thirteenth embodiment of the present invention. The two LEDs 1001Ga and 1001Gb are used in the eleventh and the twelfth embodiments, but three LEDs are used in this embodiment, which is different from the above embodiments. The same reference signs are assigned to those corresponding to the portions in the embodiments, and explanation thereof is omitted.

This embodiment is configured to further include at least one LED 1001Gc that is a third light source for supplying a third illumination light IGc having a wavelength range different from that of the first illumination light IGa and the second illumination light IGb. The three LEDs 1001Ga, 1001Gb, and 1001Gc form a light source unit. A wave combining unit includes a first dichroic mirror 1003 that is a first wave combining element, and a second dichroic mirror 1004 that is a second wave combining element. The first dichroic mirror 1003 combines the first illumination light IGa with the second illumination light IGb to output the combined lights. The structure of the first dichroic mirror 1003 that combines the illumination lights is the same as that of the eleventh embodiment. In other words, an angle θ1 of incidence of the first illumination light IGa is the same as that of the second illumination light IGb, and the angle θ1 of incidence is less than 45°.

The second dichroic mirror 1004 combines the combined lights IGab output from the first dichroic mirror 1003 with the third illumination light IGc to output the lights combined. The LED 101Gc that is the third light source and the second dichroic mirror 1004 are arranged so that an angle θ2 of the third illumination light IGc incident on the second dichroic mirror 1004 is the same as an angle θ2 of the combined lights IGab, between the first illumination light IGa and the second illumination light IGb, incident on the second dichroic mirror 1004. The angle θ2 of incidence is less than 45°.

Figure 24:
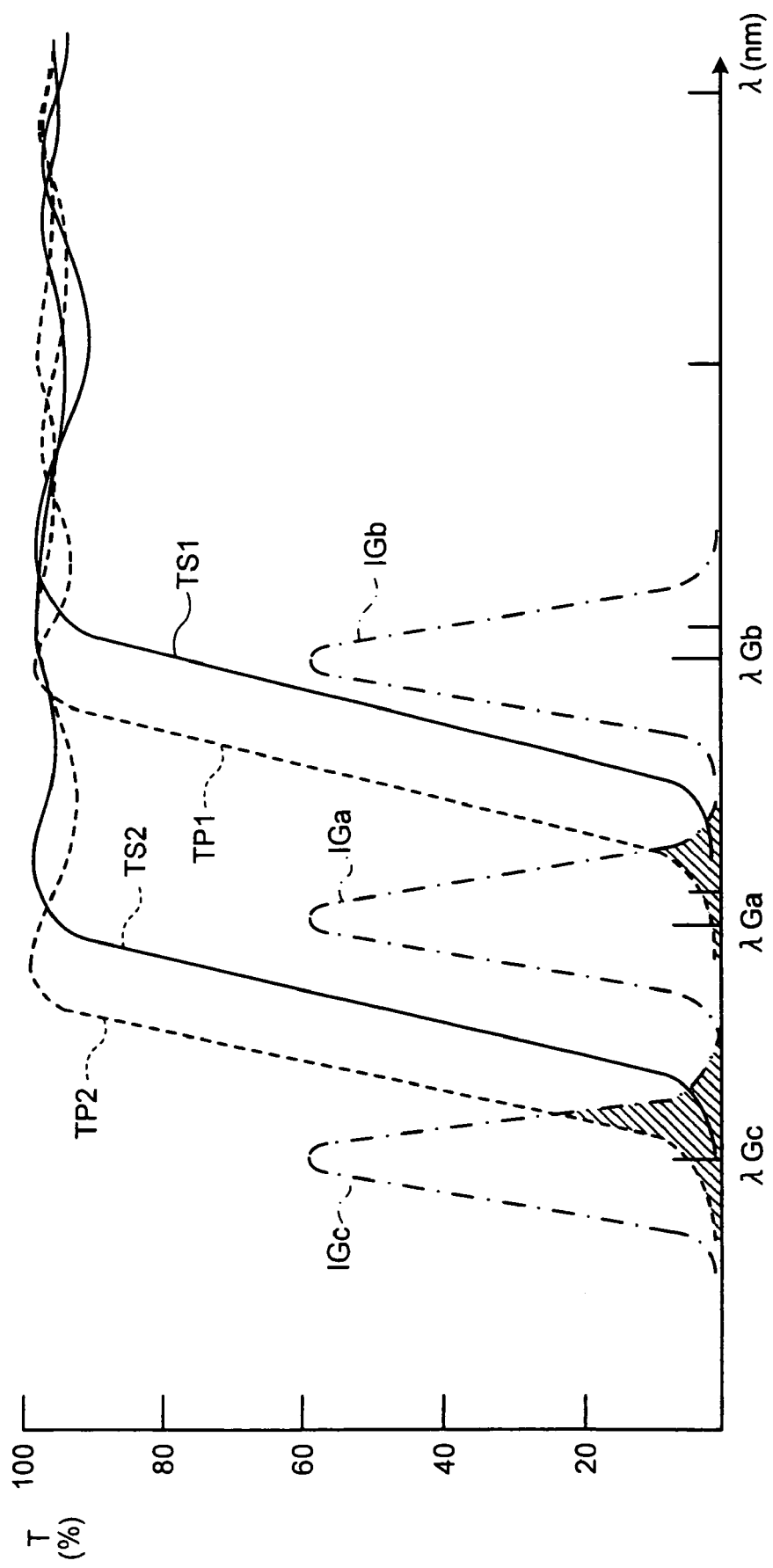
FIG. 24 is an optical characteristic diagram of a dichroic mirror.

FIG. 24 depicts intensity distributions of the two dichroic mirrors 1003 and 1004 and the three illumination lights IGa, IGb, and IGc in the superimposed manner as that of FIG. 20A. In the thirteenth embodiment, illumination lights from three or more LEDs are combined, and in order to explain this concept, λ on the x-axis of FIG. 24 represents an arbitrary wavelength. Transmittance characteristic curves TP1 and TS1 of the first dichroic mirror 1003 are the same as those of the eleventh embodiment. The first illumination light IGa with the peak wavelength λGa is reflected by the first dichroic mirror 1003 toward the second dichroic mirror 1004. The second illumination light IGb with the peak wavelength λGb is made to pass through the first dichroic mirror 1003 toward the second dichroic mirror 1004. As explained above, the first dichroic mirror 1003 outputs the combined lights IGab between the first illumination light IGa and the second illumination light IGb.

A transmittance characteristic curve TP2 of the p-polarized light component and a transmittance characteristic curve TS2 of the s-polarized light component of the second dichroic mirror 1004 shift to the shorter wavelength side than the transmittance characteristic curves TP1 and TS1 of the first dichroic mirror 1003. The second dichroic mirror 1004 passes the combined lights IGab between the first illumination light IGa and the second illumination light IGb on the longer wavelength side than the edge wavelength of the transmittance characteristic curve TS2. Furthermore, the second dichroic mirror 1004 reflects the third illumination light IGc on the smaller wavelength side than the edge wavelength of the transmittance characteristic curve TP2. Thus, the second dichroic mirror 1004 passes the combined lights IGab and reflects the third illumination light IGc to combine them.

It is desirable that the central axes (optical axes) of the three illumination lights IGa, IGb, and IGc are made substantially coincident with one another to combine them. Substantial coincidence of the central axes allows illumination to be efficiently performed when a spatial-light modulating device as explained later is illuminated. Therefore, the angles θ1 of the first illumination light IGa and the second illumination light IGb incident on the first dichroic mirror 1003 are made mutually equal to each other. Likewise, the angles θ2 of the combined lights IGab and the third illumination light IGc incident on the second dichroic mirror 1004 are made mutually equal to each other. Both the incident angle θ1 and the incident angle θ2 are less than 45°. Note that the incident angle θ1 and the incident angle θ2 may be the same as or different from each other. In the thirteenth embodiment as explained above, it is possible to combine at least three illumination lights such that the peak wavelengths λGa, λGb, and λGc of the first illumination light IGa, the second illumination light IGb, and the third illumination light IGc are approximate to one another. Therefore, the illumination lights with further higher intensity can be obtained. Moreover, in the areas shaded of FIG. 24, the loss of light amount may occur caused by light transmission. In this case, both the first illumination light IGa and the third illumination light IGc are converted to s-polarized lights, which allows the loss of light amount to be reduced. In this embodiment, the structure of combining the three illumination lights has been explained. However, the explanation is not thus limited, and illumination lights from at least four LEDs can be combined in the same manner as explained above.

Figure 25:
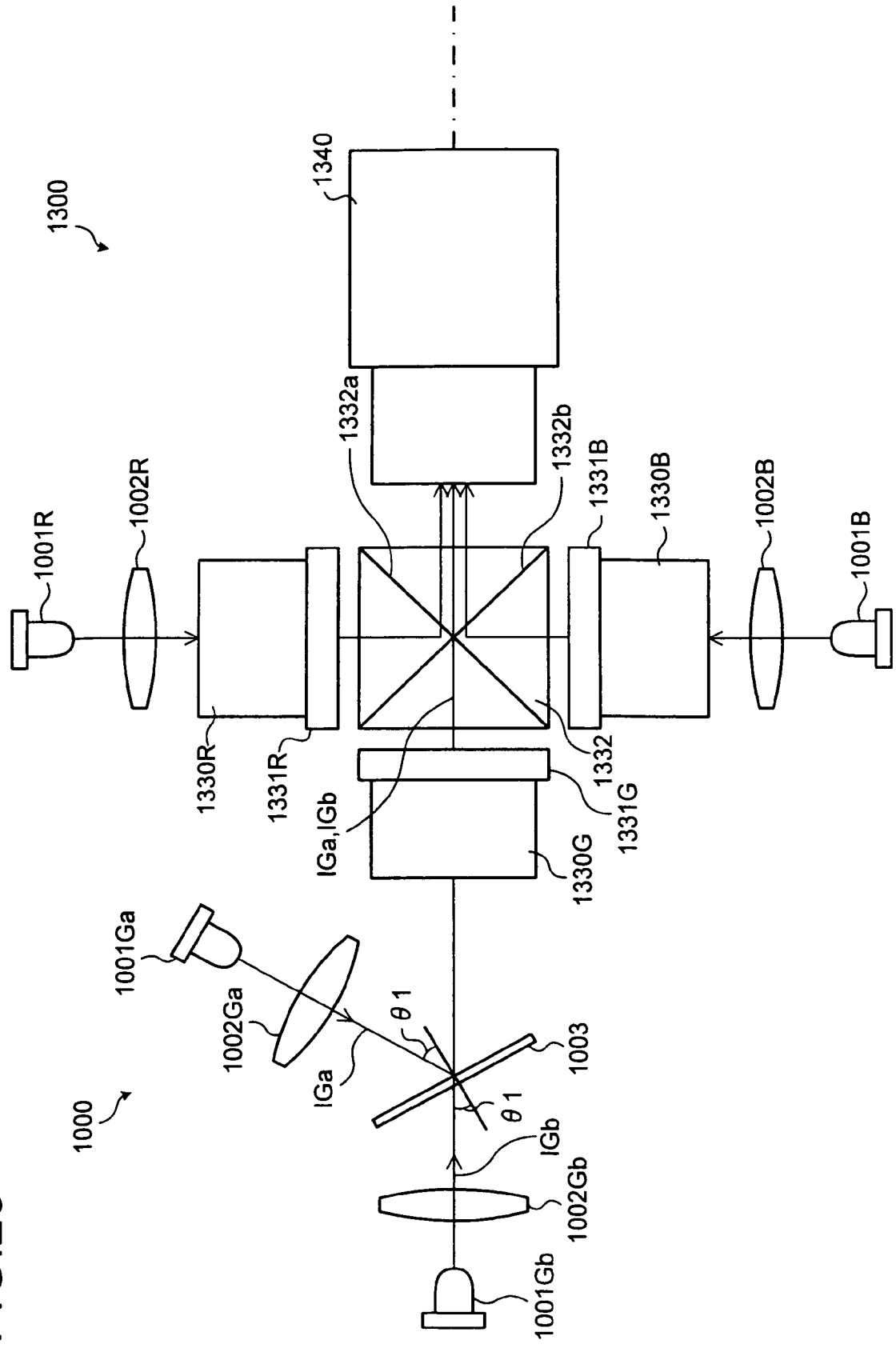
FIG. 25 is a schematic diagram of a projector according to a fourteenth embodiment of the present invention.

FIG. 25 depicts a schematic structure of a projector 1300 according to a fourteenth embodiment. The projector 1300 includes the lighting device 1000 according to the eleventh embodiment to supply the G light. An LED 1001R supplies R light, and an LED 1001B supplies B light. Generally, in order to obtain a projected image of white color as a whole by projecting the R light, the G light, and the B light, the amount of luminous flux of the G light needs to be in a range from about 60% to about 80% with respect to the amount of whole luminous flux. Therefore, in the fourteenth embodiment, the lighting device 1000 is arranged so as to supply high-intensity G light in order to increase the amount of G light as compared with the R light and the B light.

The R light is explained first. The LED 1001R emits the R light. A collimator lens 1002R converts the R light to substantially collimated light to be output. The R light collimated enters an integrator optical system 1330R. The integrator optical system 1330R makes the incident light uniform to superposedly illuminate a transmission-type liquid-crystal light valve 1331R that is the spatial-light modulating device. The integrator optical system 1330R may be formed with a fly eye lens or a rod lens.

The B light is explained below. The LED 1001B emits the B light. A collimator lens 1002B converts the B light to substantially collimated light to be output. The B light collimated enters an integrator optical system 1330B having the same structure as explained above. The integrator optical system 1330B makes the incident light uniform to superposedly illuminate a transmission-type liquid-crystal light valve 1331B that is the spatial-light modulating device.

The G light is explained below. The G light is supplied by using the lighting device 1000 according to the eleventh embodiment. This allows the high-intensity G light with high color purity to be obtained as explained in the eleventh embodiment. The G light from the lighting device 1000 enters an integrator optical system 1330G. The integrator optical system 1330G makes the incident light uniform to superposedly illuminate a transmission-type liquid-crystal light valve 1331G that is the spatial-light modulating device.

The R light, the G light, and the B light incident on the transmission-type liquid-crystal light valves 1331R, 1331G, and 1331B are spatially modulated thereby according to image signals, respectively. The colored lights having passed through the respective transmission-type liquid-crystal light valves 1331R, 1331G, and 1331B enter a cross dichroic prism 1332. The cross dichroic prism 1332 includes a first cross dichroic film 1332a and a second cross dichroic film 1332b that are arranged in an X-character shape. The first cross dichroic film 1332a passes the G light and reflects the B light. The second cross dichroic film 1332b passes the G light and reflects the R light. This allows the cross dichroic prism 1332 to combine the R light, the G light, and the B light to output the lights combined. An image of the combined lights output from the cross dichroic prism 1332 enters the projection lens 1340, and the image is projected at an appropriate enlargement ratio onto a screen (not shown) provided outside the projector 1300. As explained above, the projector 1300 projects the image obtained by combining the images of the colored lights formed in the transmission-type liquid-crystal light valves 1331R, 1331G, and 1331B onto the screen as a moving image or a still image. It is noted that appropriate polarizing plates (not shown) are arranged in their adequate states at suitable locations around the respective transmission-type liquid-crystal light valves 1331R, 1331G, and 1331B so that these transmission-type liquid-crystal light valves 1331R, 1331G, and 1331B are illuminated with the polarized lights for reading.

According to the projector 1300, the first illumination light IGa and the second illumination light IGb can be efficiently combined (wave-combined) with each other by using the dichroic mirror 1003. Therefore, the color purity of G illumination light finally obtained by the wave combination can be increased and the intensity thereof can be improved. As a result, it is possible to obtain a projected image with bright and excellent color reproducibility.

Figure 26:
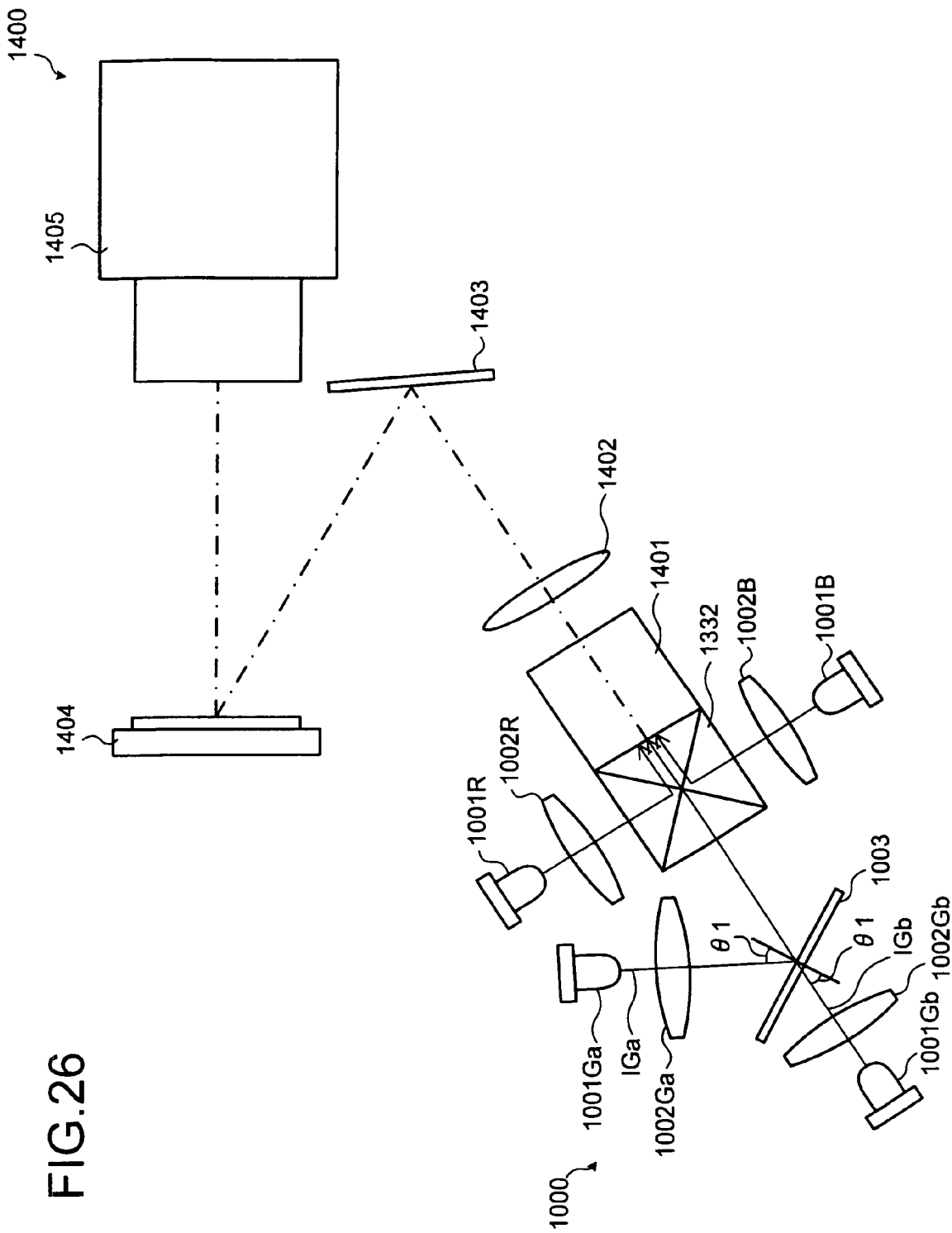
FIG. 26 is a schematic diagram of a projector according to a fifteenth embodiment of the present invention.

FIG. 26 depicts a schematic structure of a projector 1400 according to a fifteenth embodiment of the present invention. The projector 1400 is a modification of the projector 1430 according to the fourteenth embodiment, and the DMD is used instead of the transmission-type liquid-crystal light valve. The same reference signs are assigned to those corresponding to the portions in the embodiments, and explanation thereof is omitted.

The R light from the LED 1001R is converted to substantially collimated light in the collimator lens 1002R to enter the cross dichroic prism 1332. The G light from the LED 1001G is converted to substantially collimated light in the collimator lens 1002G to enter the cross dichroic prism 1332.

The G lights from the lighting device 1000 as explained in the eleventh embodiment enter the cross dichroic prism 1332 in a substantially collimated state. The cross dichroic prism 1332 combines the R light, the G light, and the B light in the same manner as that of the fourteenth embodiment to output the lights combined. The lights combined enter an integrator optical system 1401. The integrator optical system 1401 may include the fly eye lens or the rod lens. The combined colored lights output from the integrator optical system 1401 are evenly emitted to an DMD 1404 through a lens 1402 and a mirror 1403 in a superimposed manner. In this case, by appropriately adjusting a position and a focal length of the lens 1402, the DMD 1404 can be evenly illuminated. Note that the operation of one frame in the projector 1400 according to the fifteenth embodiment is the same as that of the projector 910 according to the tenth embodiment as explained with reference to FIG. 18.

According to the projector 1400, both the illumination lights IGa and IGb from the LEDs 1001Ga and 1001Gb corresponding to the G light are combined with high color purity to allow them to enter the DMD 1404. Therefore, it is possible to increase the luminance of an image to be projected and obtain a projected image with excellent color reproduction.

Although the present invention has been explained according to the embodiments, it is not limited by the embodiments. For example, instead of the transmission-type liquid-crystal light valves that are used as the spatial-light modulating devices, reflection-type liquid-crystal elements may also be used. Furthermore, the liquid-crystal light valve may be an optical writing type liquid-crystal light valve.

In the embodiments, the case where a pair of G lights whose wavelengths are close to each other is combined to increase the intensity of the G lights with high color purity has been explained. This is true for the other lights, the R light and the B light, that is, lights from a pair of light sources whose peak wavelengths are close to each other can be combined into one illumination light.

In the embodiments, the structure in which the dichroic mirror has the function as the high-pass filter has been explained. However, the present invention is not limited to the structure, and any structure in which the dichroic mirror has a function as the low-pass filter can also be used.

Furthermore, either the reflecting action or the transmitting action of the dichroic mirror may be used if a plurality of illumination lights can be combined in a predetermined direction to be output. For example, in the eleventh embodiment, the dichroic mirror 1003 may pass the first illumination light IGa and reflect the second illumination light IGb to combine them. Furthermore, polarized states of all the illumination lights can be controlled. If the non-polarized light is not used but the polarized light is used as illumination light, the loss of light amount can be reduced, which makes it possible to obtain the illumination light with further higher intensity.

What is claimed is:

1. A lighting device comprising:
   a light source unit that includes at least two light sources of a first light source that supplies a first illumination light and a second light source that supplies a second illumination light having a wavelength range different from that of the first illumination light; and
   a wave combining unit that combines the first illumination light and the second illumination light both of which are traveling from different directions, and emits the illumination lights combined,
   wherein the light source unit and the wave combining unit are arranged so that an angle of the first illumination light incident on the wave combining unit and an angle of the second illumination light incident on the wave combining unit are substantially the same as each other, and are less than 45°.

2. The lighting device according to claim 1, wherein the light source unit further includes at least one third light source that supplies a third illumination light having a wavelength range different from the wavelength ranges of the first illumination light and the second illumination light,
   the wave combining unit includes at least two wave combining elements of a first wave combining element that combines the first illumination light with the second illumination light to emit the illumination lights combined, and a second wave combining element that combines the illumination lights combined emitted from the first wave combining element with the third illumination light to be emitted, and
   the third light source and the second wave combining element are arranged so that an angle of the third illumination light incident on the second wave combining element and an angle of the illumination lights combined incident on the second wave combining element are substantially the same as each other, and are less than 45°.

3. The lighting device according to claim 1, wherein the wave combining unit is a light combining element that uses transmitting action and reflecting action of light,
   the light combining element has a first edge wavelength and a second edge wavelength that are different from each other, the first edge wavelength being in a wavelength range where transmittance characteristic or reflectance characteristic for a linearly polarized light in a predetermined direction of vibration is switched, and the second edge wavelength being in a wavelength range where transmittance characteristic or reflectance characteristic for a linearly polarized light in a direction of vibration substantially perpendicular to the predetermined direction of vibration is switched, and
   wherein the lighting device further comprises:
   a polarization converter that converts at least one of the first illumination light and the second illumination light to a linearly polarized light in the predetermined direction of vibration or to a linearly polarized light in a direction of vibration substantially perpendicular to the predetermined direction of vibration, wherein at least a part of the wavelength range of the first illumination light or of the second illumination light is superimposed on a wavelength range between the first edge wavelength and the second edge wavelength.

4. A projector comprising:
   a lighting device including
      a light source unit that includes at least two light sources of a first light source that supplies a first illumination light and a second light source that supplies a second illumination light having a wavelength range different from that of the first illumination light; and
      a wave combining unit that combines the first illumination light and the second illumination light both of which are traveling from different directions to emit the illumination lights combined;
   a spatial-light modulating device that modulates the illumination lights from the lighting device according to an image signal; and
   a projection lens that projects the illumination lights modulated,
   wherein the light source unit and the wave combining unit are arranged so that an angle of the first illumination light incident on the wave combining unit and an angle of the second illumination light incident on the wave combining unit are substantially the same as each other, and are less than 45°.

* * * * *